US006543182B2

(12) United States Patent
Snell et al.

(10) Patent No.: US 6,543,182 B2
(45) Date of Patent: Apr. 8, 2003

(54) APPARATUS FOR MONITORING AND/OR CONTROLLING TERMITES

(75) Inventors: Eric J. Snell, Line Lexington, PA (US); Joe H. Hope, III, Mebane, NC (US); Bruce C. Yeagle, Langhorne, PA (US)

(73) Assignee: Aventis CropScience S.A., Lyons (FR)

( * ) Notice: Subject to any disclaimer, the term of this patent is extended or adjusted under 35 U.S.C. 154(b) by 0 days.

(21) Appl. No.: 09/819,582

(22) Filed: Mar. 28, 2001

(65) Prior Publication Data

US 2002/0023382 A1 Feb. 28, 2002

Related U.S. Application Data

(63) Continuation-in-part of application No. 09/644,448, filed on Aug. 23, 2000, now abandoned, and a continuation-in-part of application No. 09/644,449, filed on Aug. 23, 2000, now abandoned.

(51) Int. Cl.[7] .................................................. A01M 1/20
(52) U.S. Cl. ...................................................... 43/132.1
(58) Field of Search ........................................ 43/132.1

(56) References Cited

U.S. PATENT DOCUMENTS 6,158,166 A * 12/2000 Snell et al. .................... 43/131
6,164,010 A * 12/2000 Snell et al. .................... 43/131
6,378,243 B1 * 4/2002 Snell et al. .................... 43/131

* cited by examiner

Primary Examiner—Charles T. Jordan
Assistant Examiner—Jordan M Lofdahl
(74) Attorney, Agent, or Firm—Connolly Bove Lodge and Hutz LLP

(57) ABSTRACT

A housing is provided for a station or device adapted for monitoring and/or controlling termites or other insects, and which is adapted to be situated in or on soil or sand. The housing contains a substance attractive for termite exploration and/or termite feeding, and comprises at least one wall and at least one surface, which surface defines at least one path attractive to termites, such as a groove or a channel. The housing can be adapted to receive a second insect monitoring and controlling device.

30 Claims, 39 Drawing Sheets

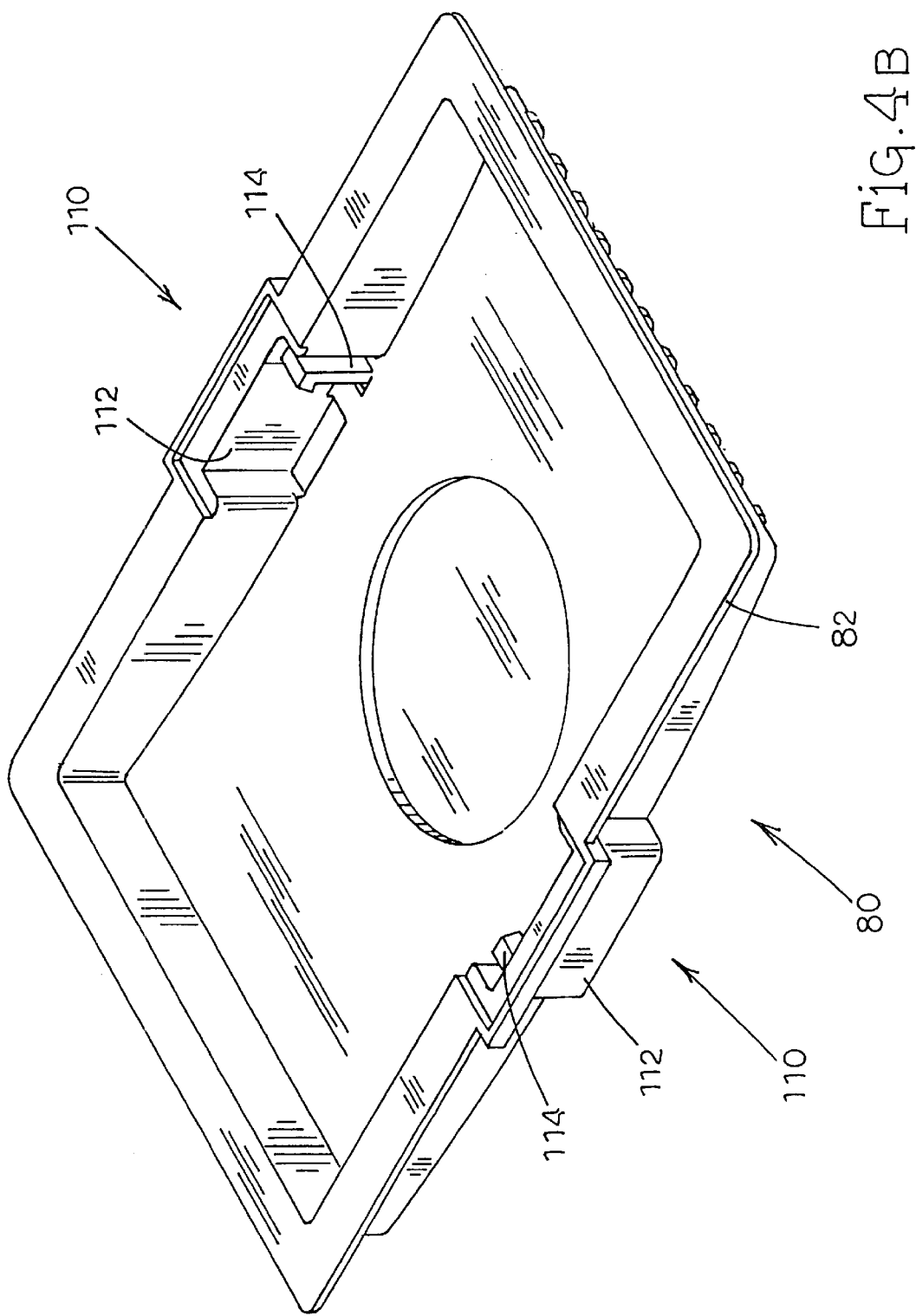

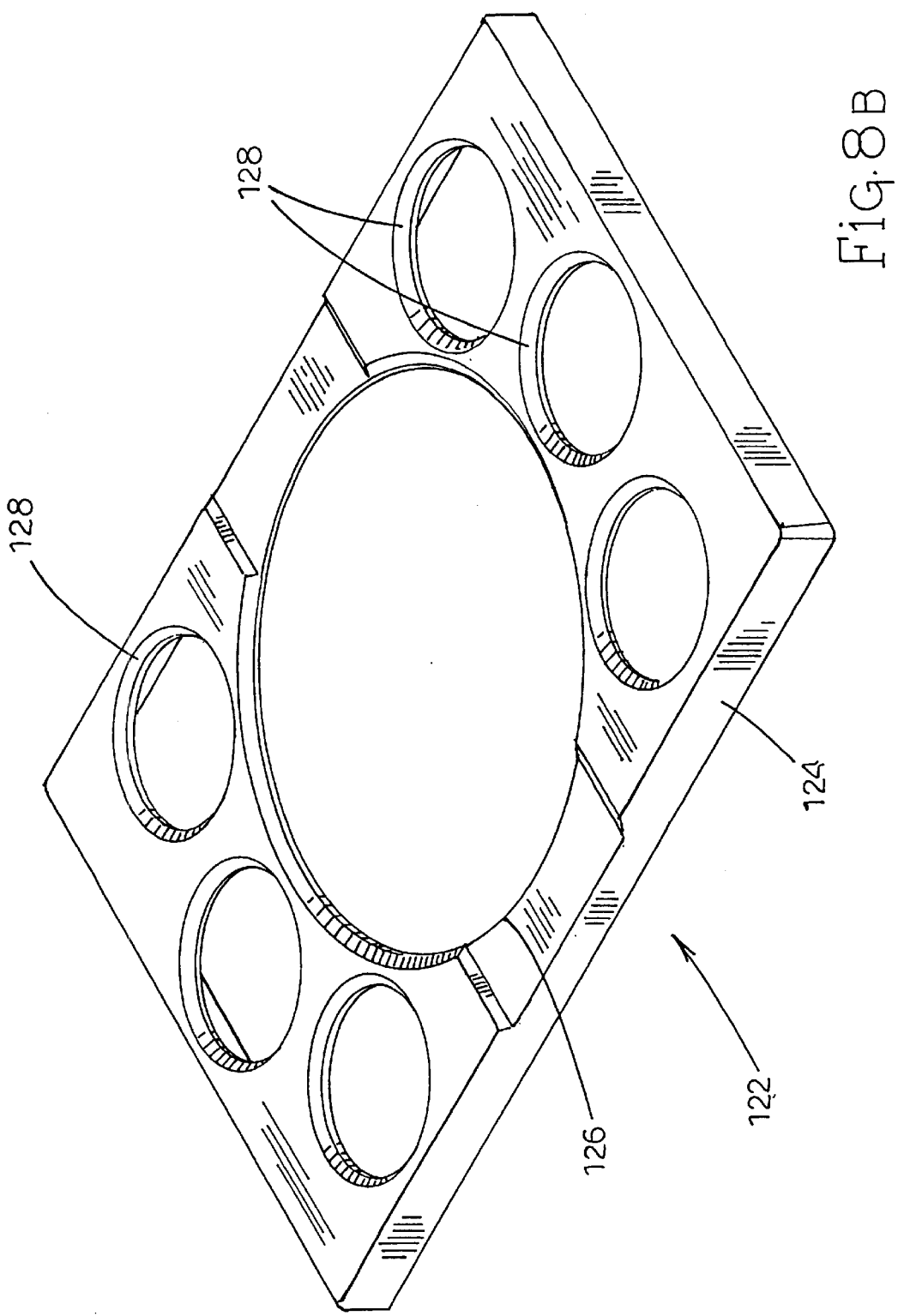

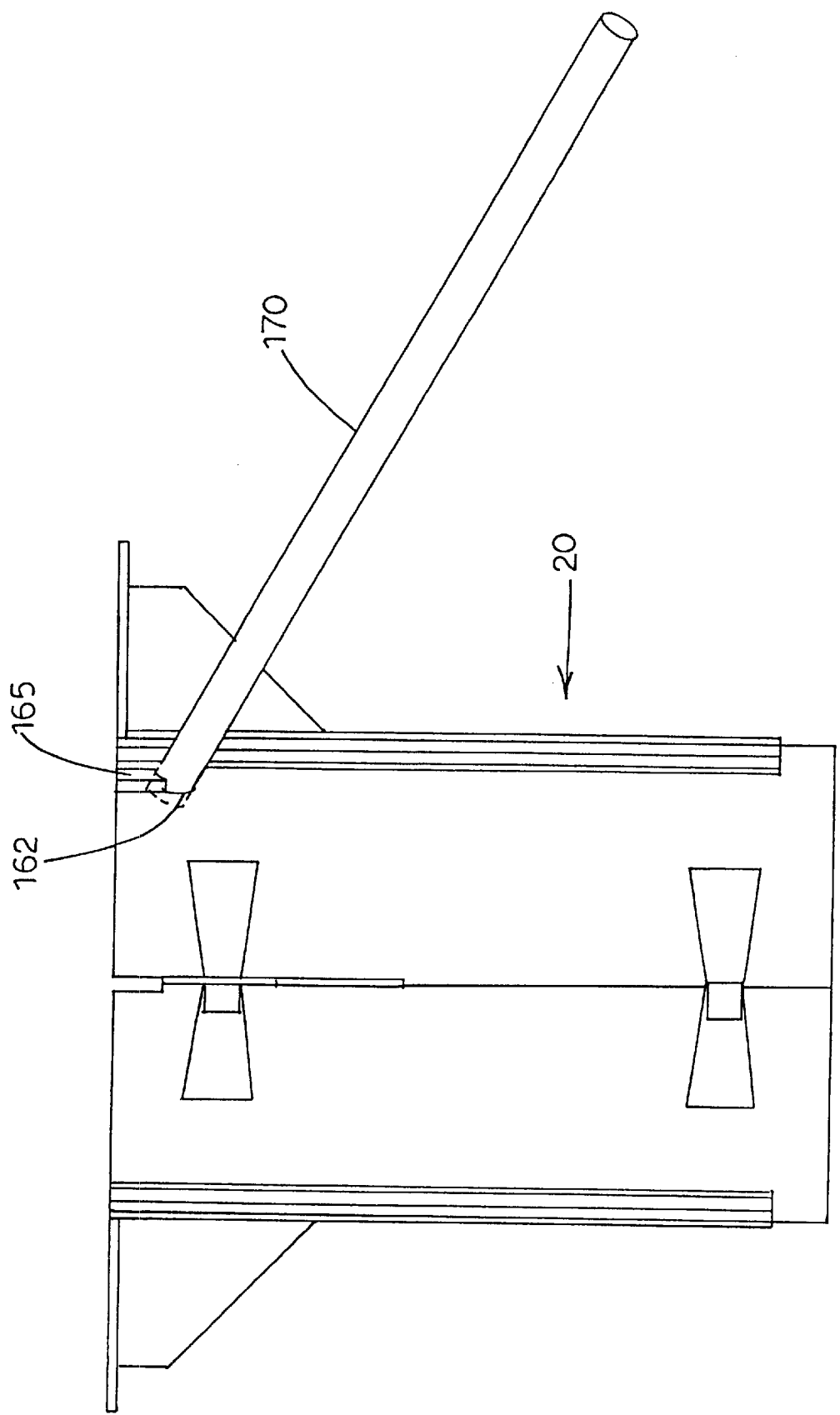

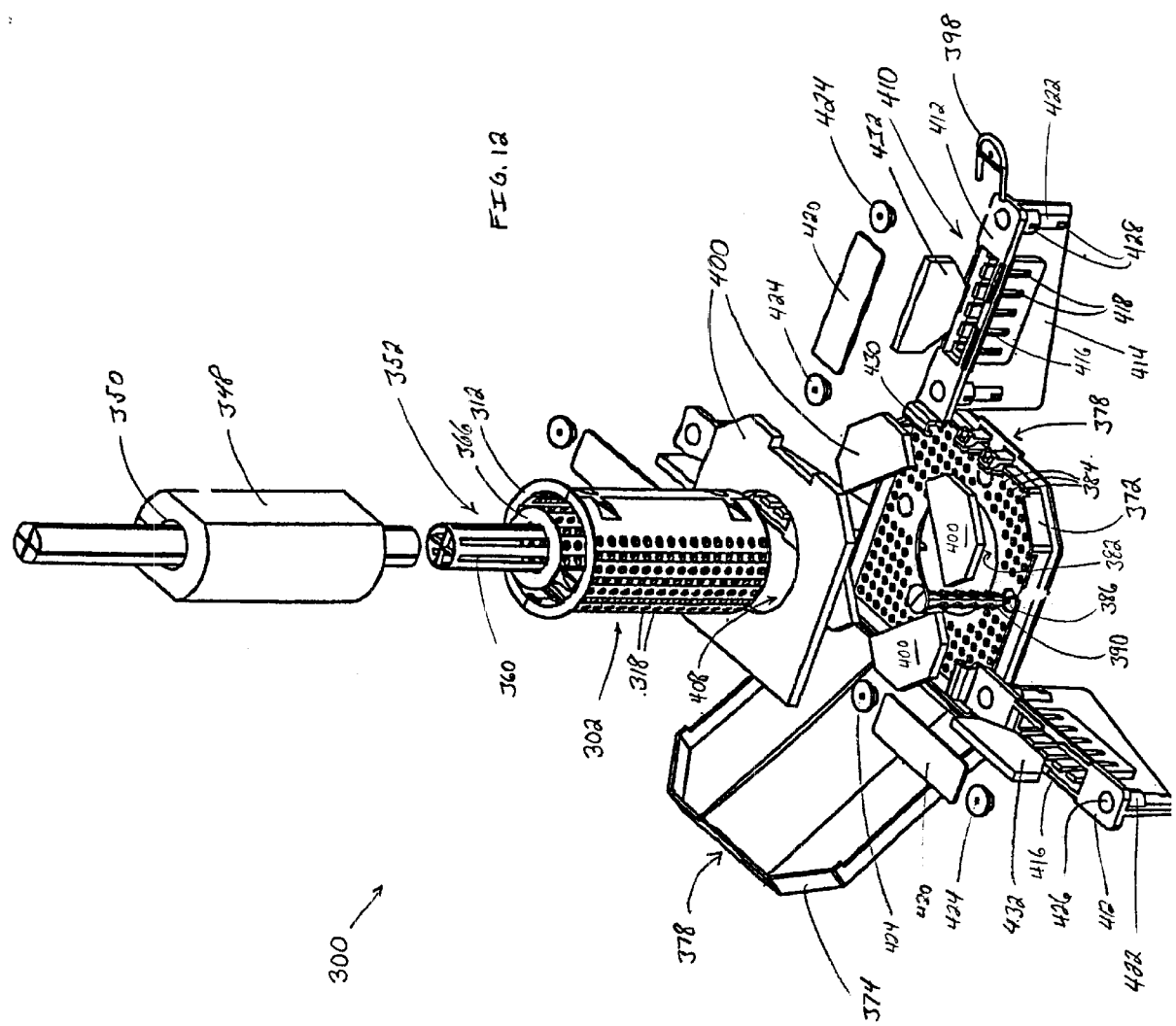

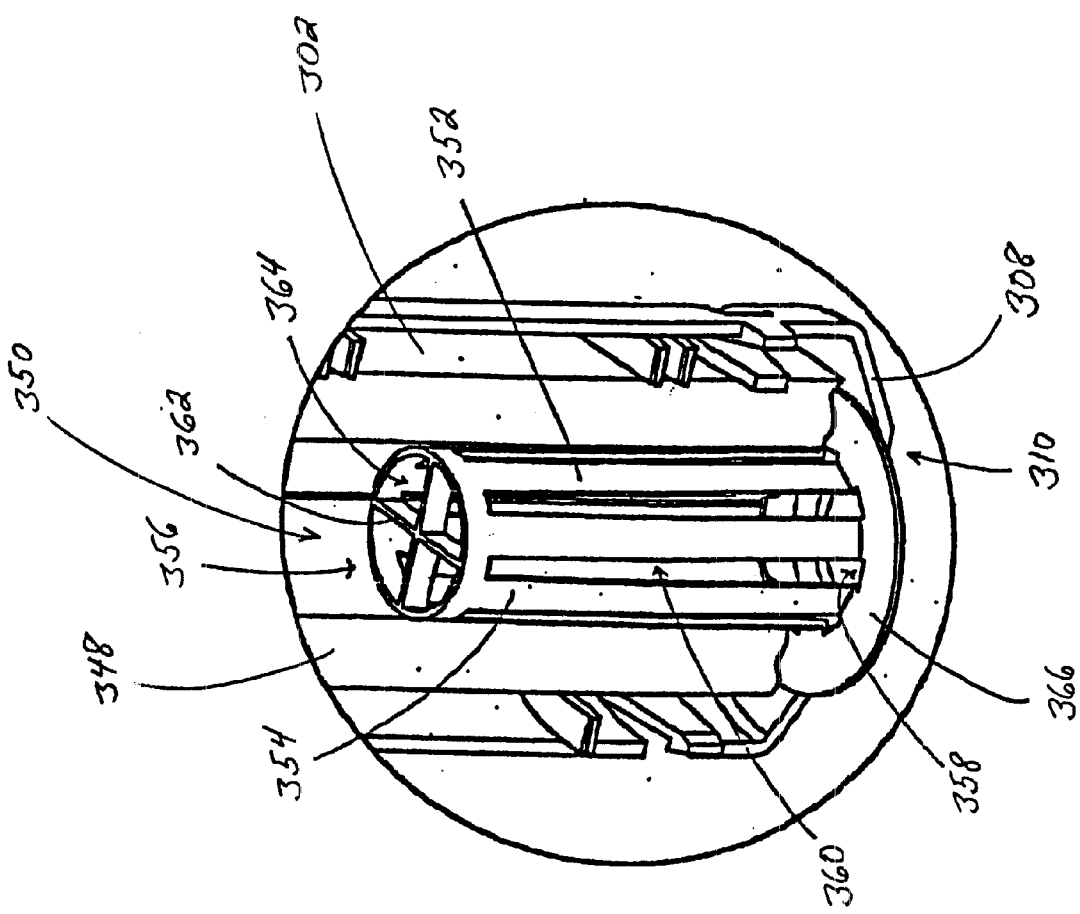

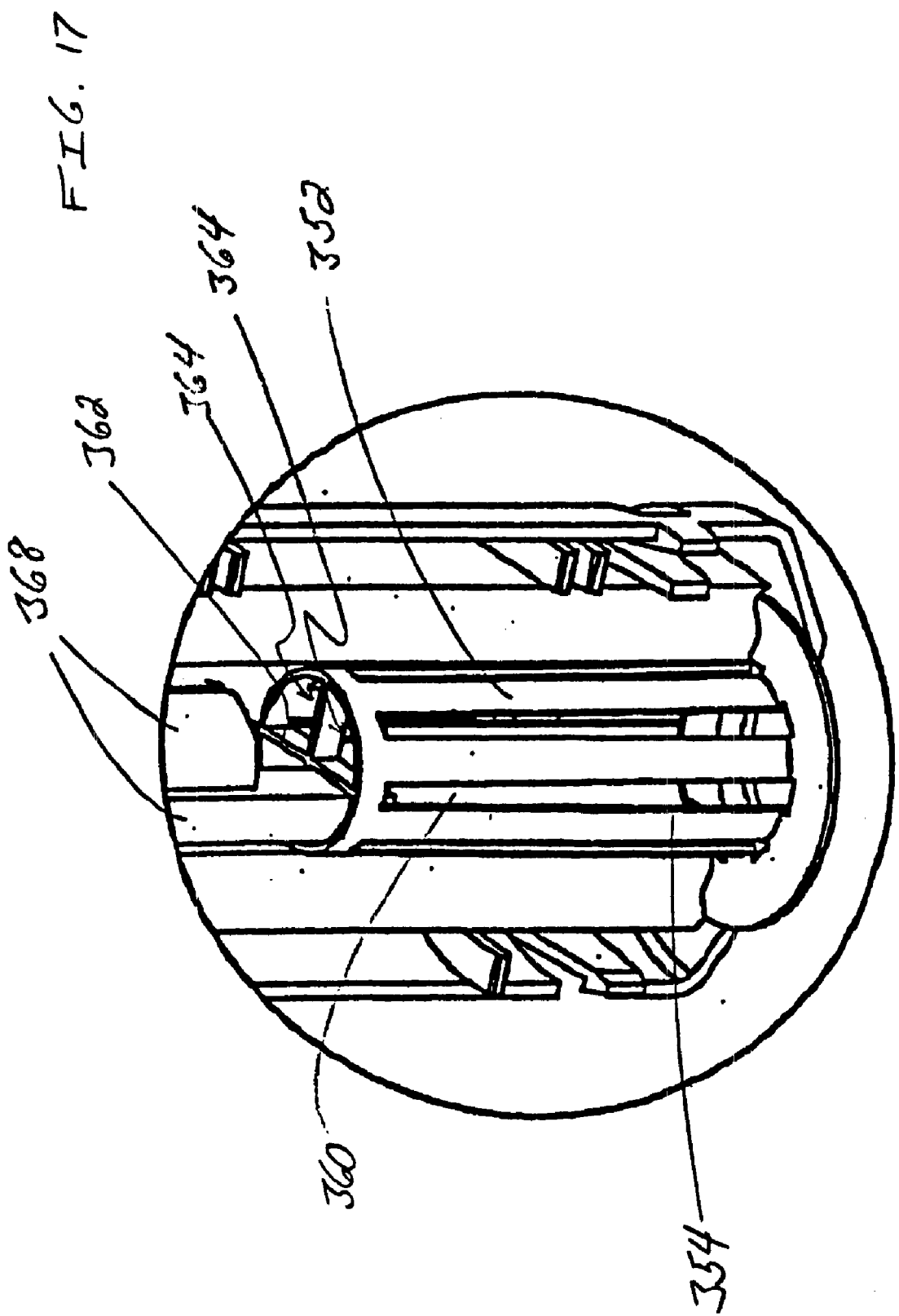

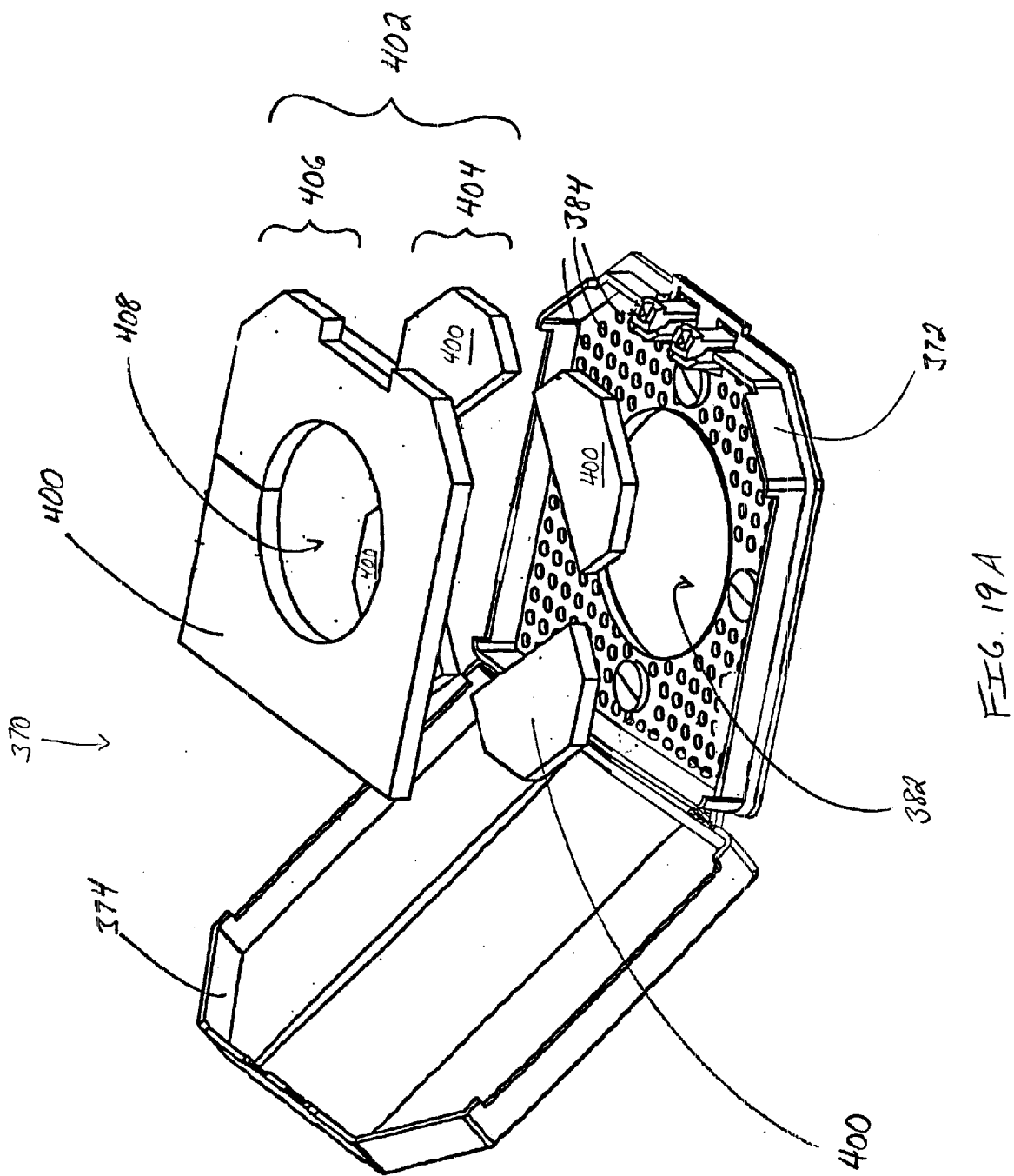

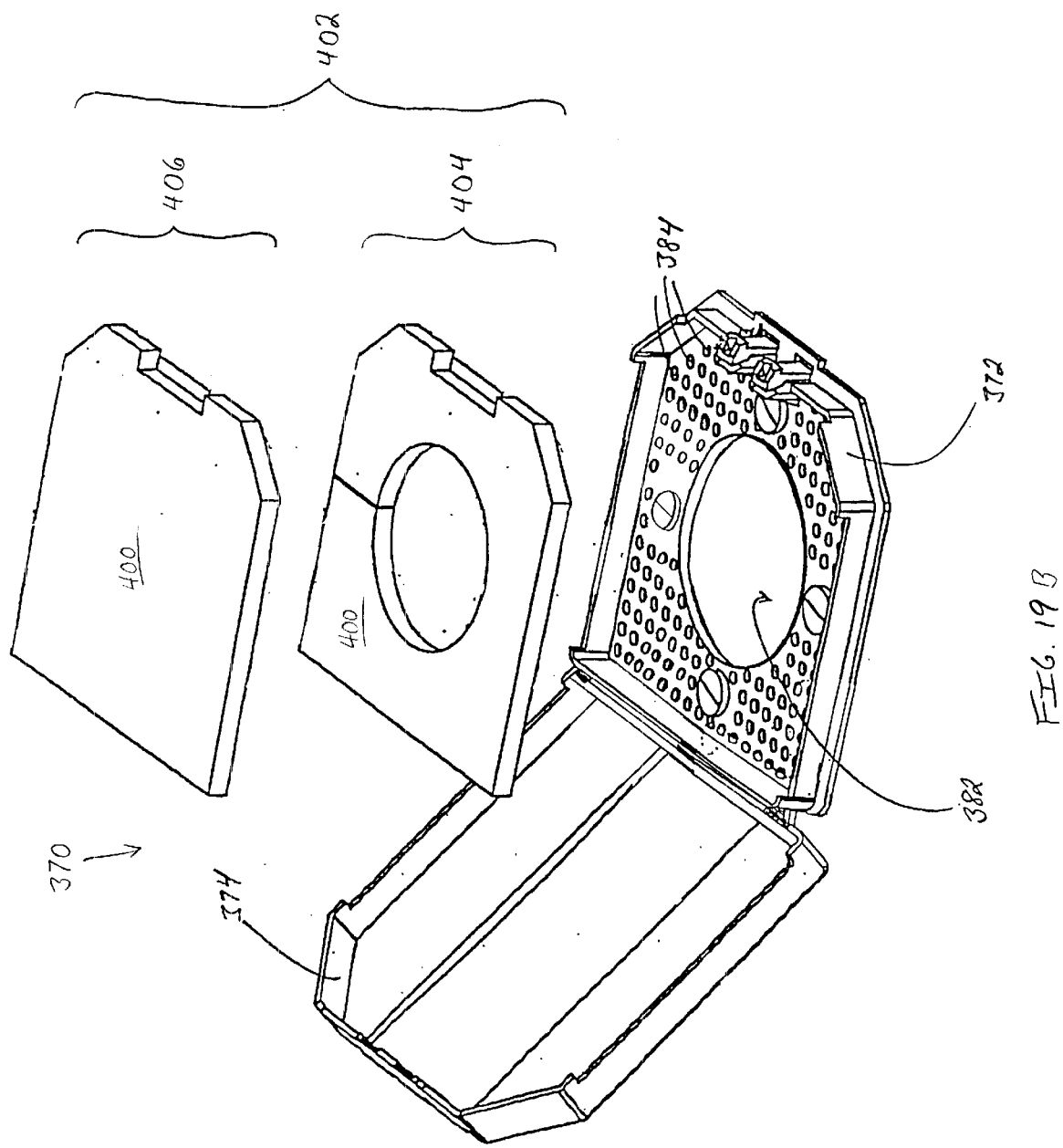

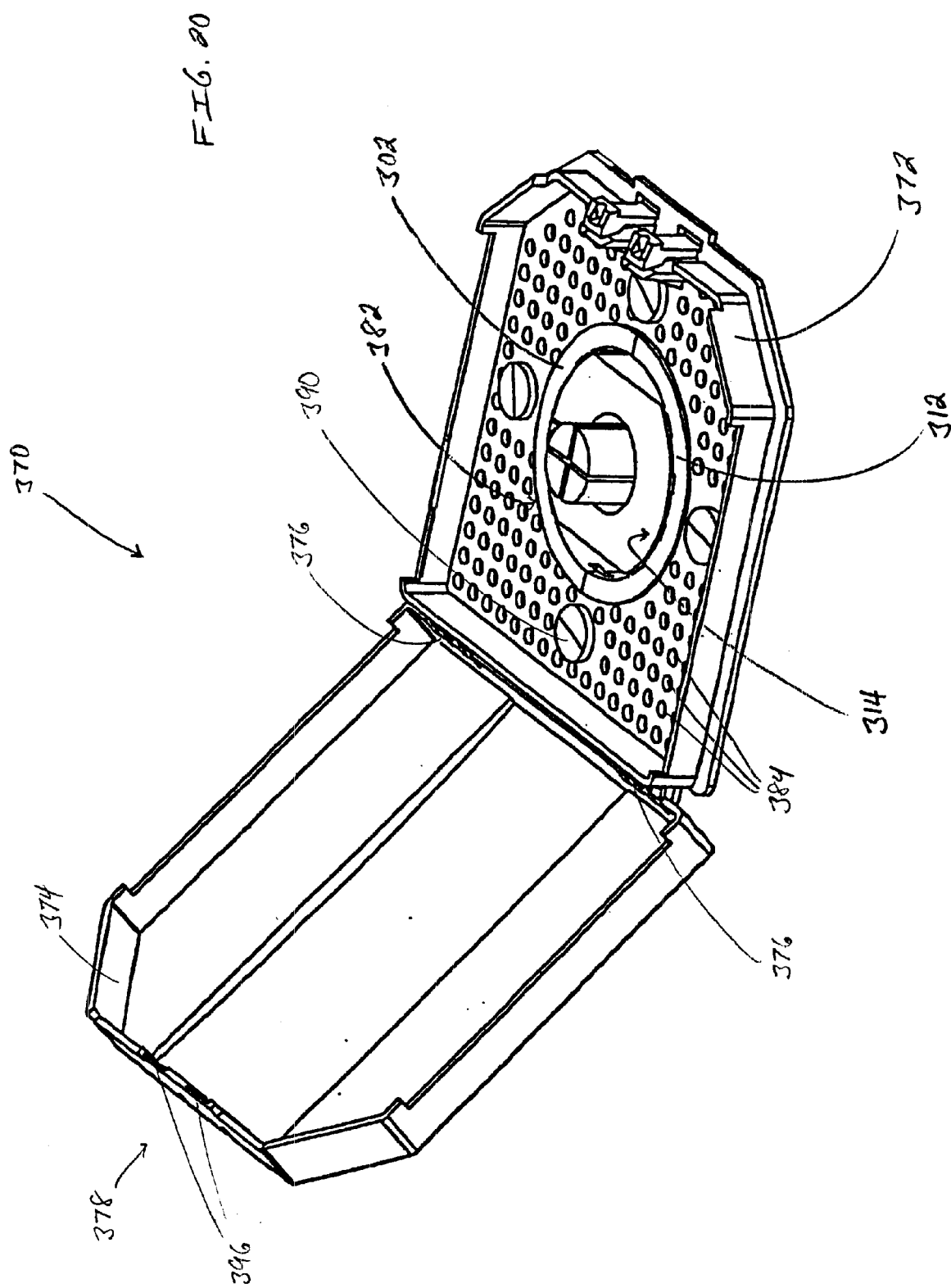

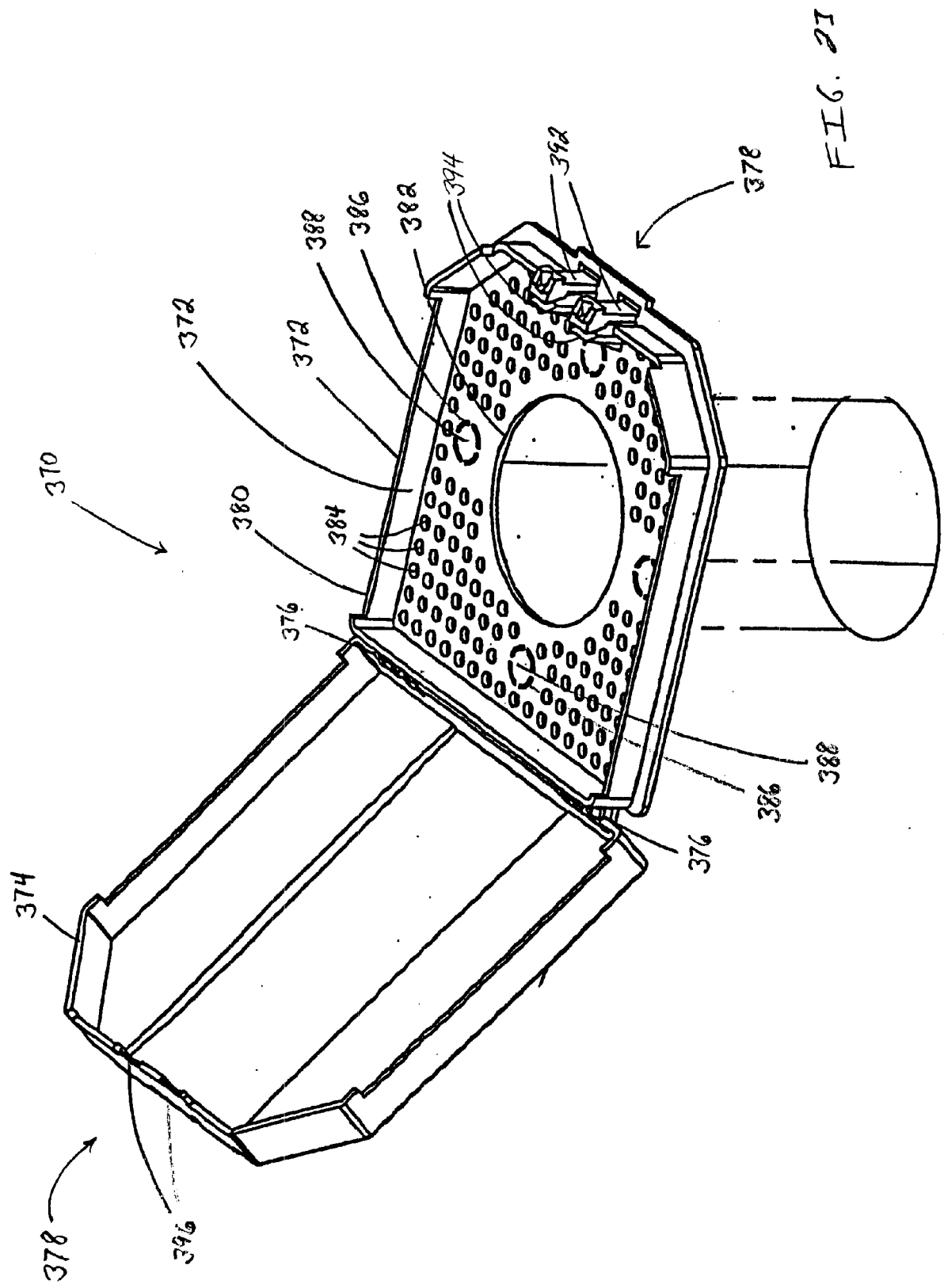

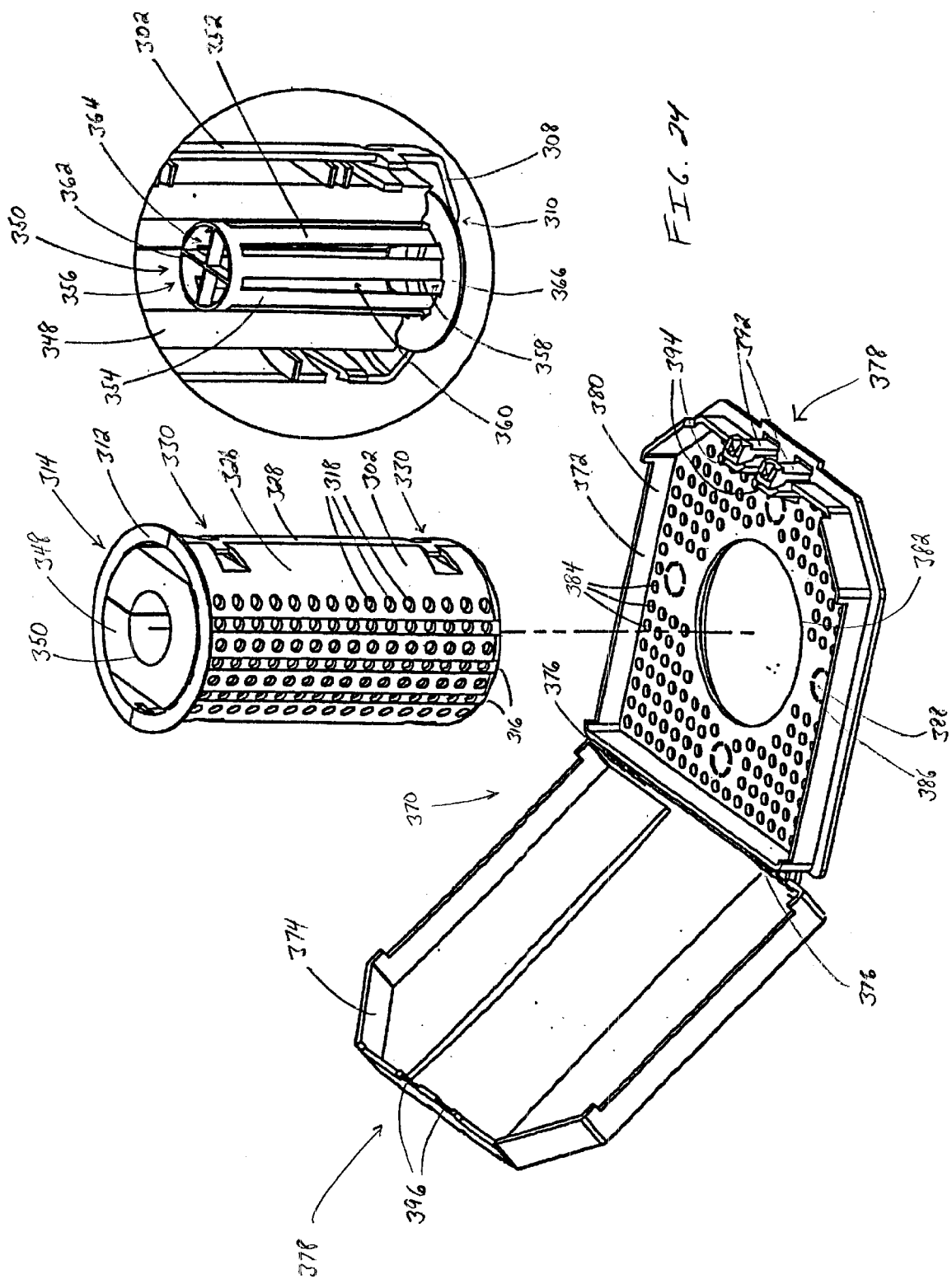

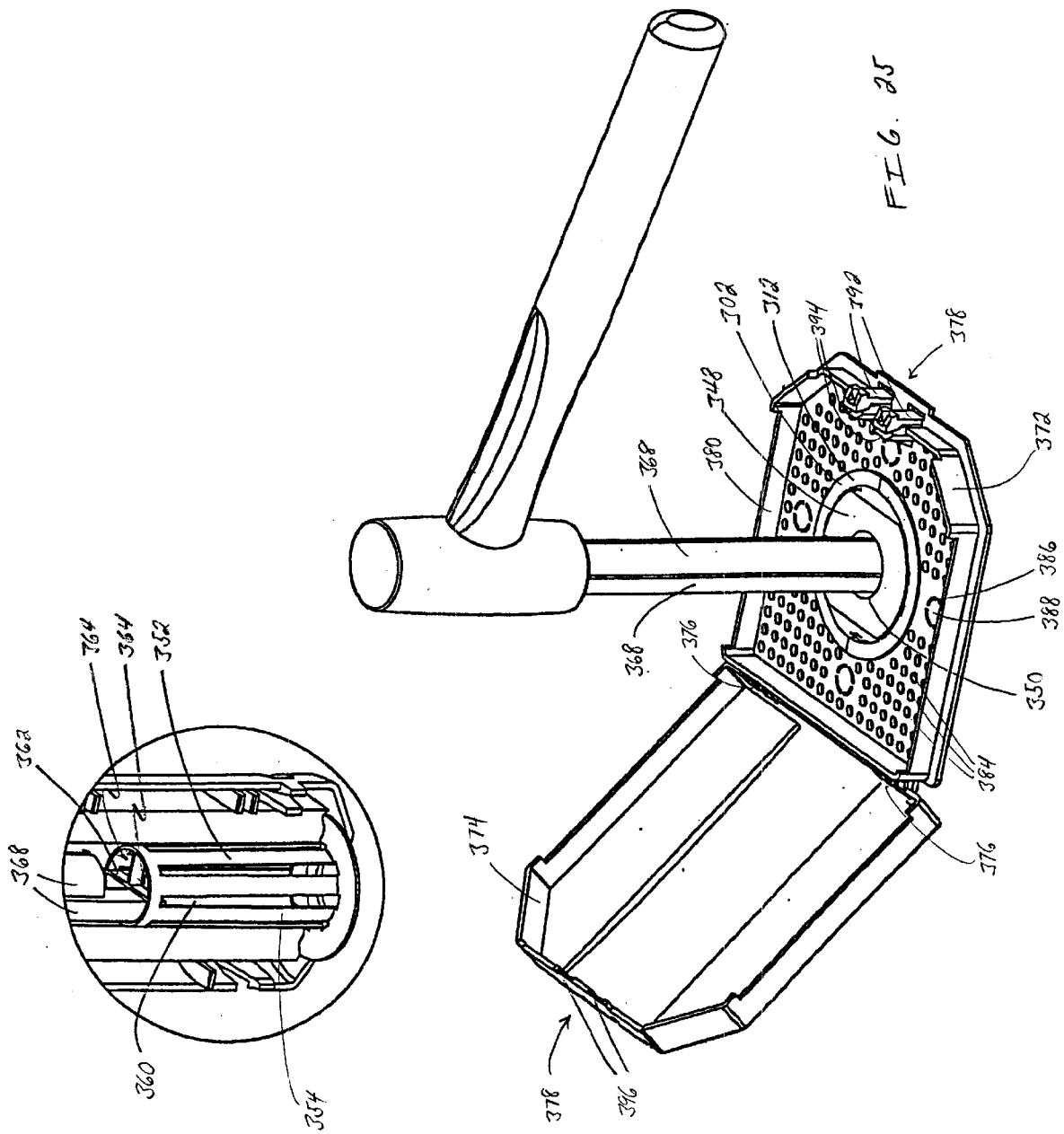

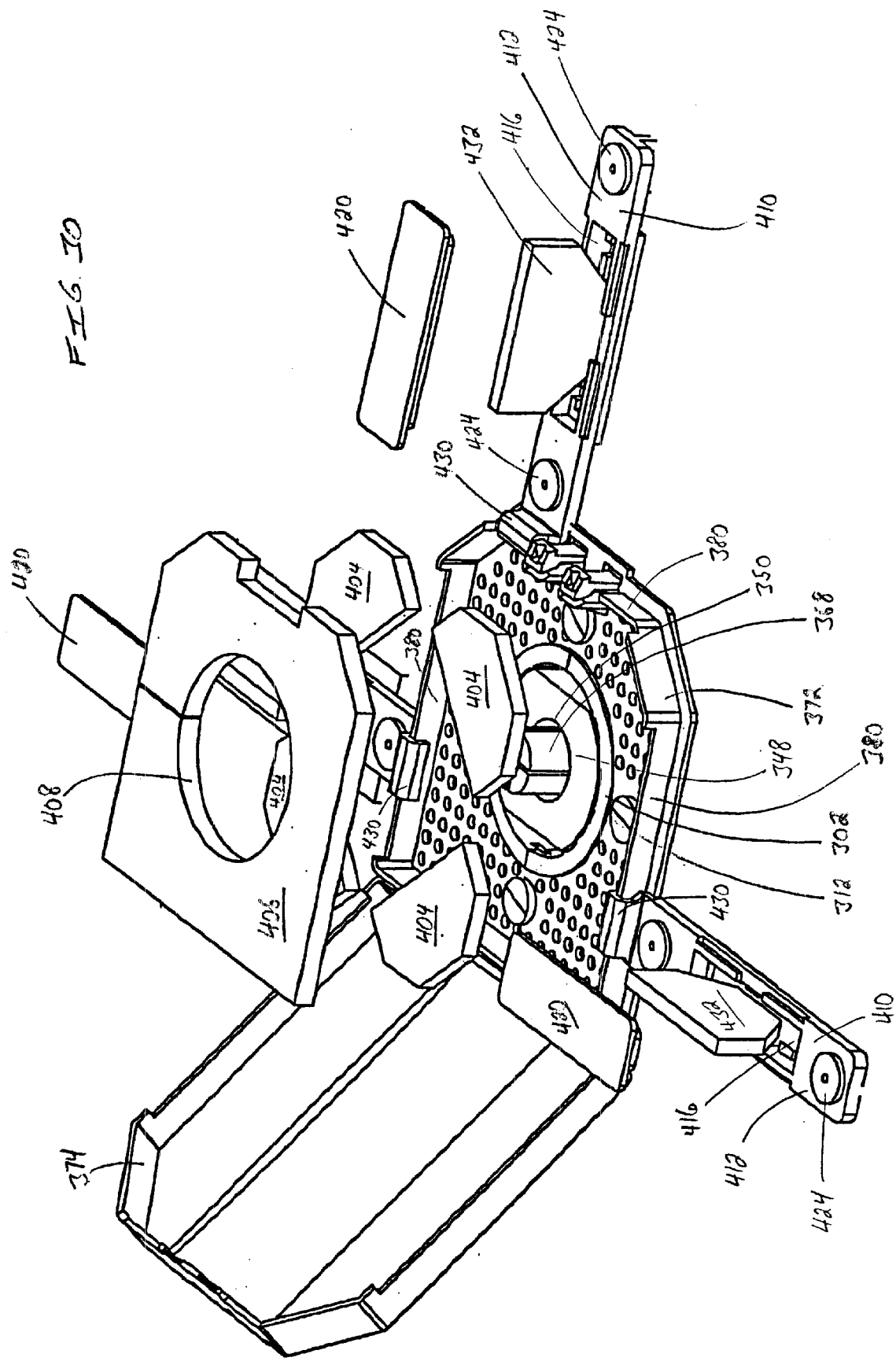

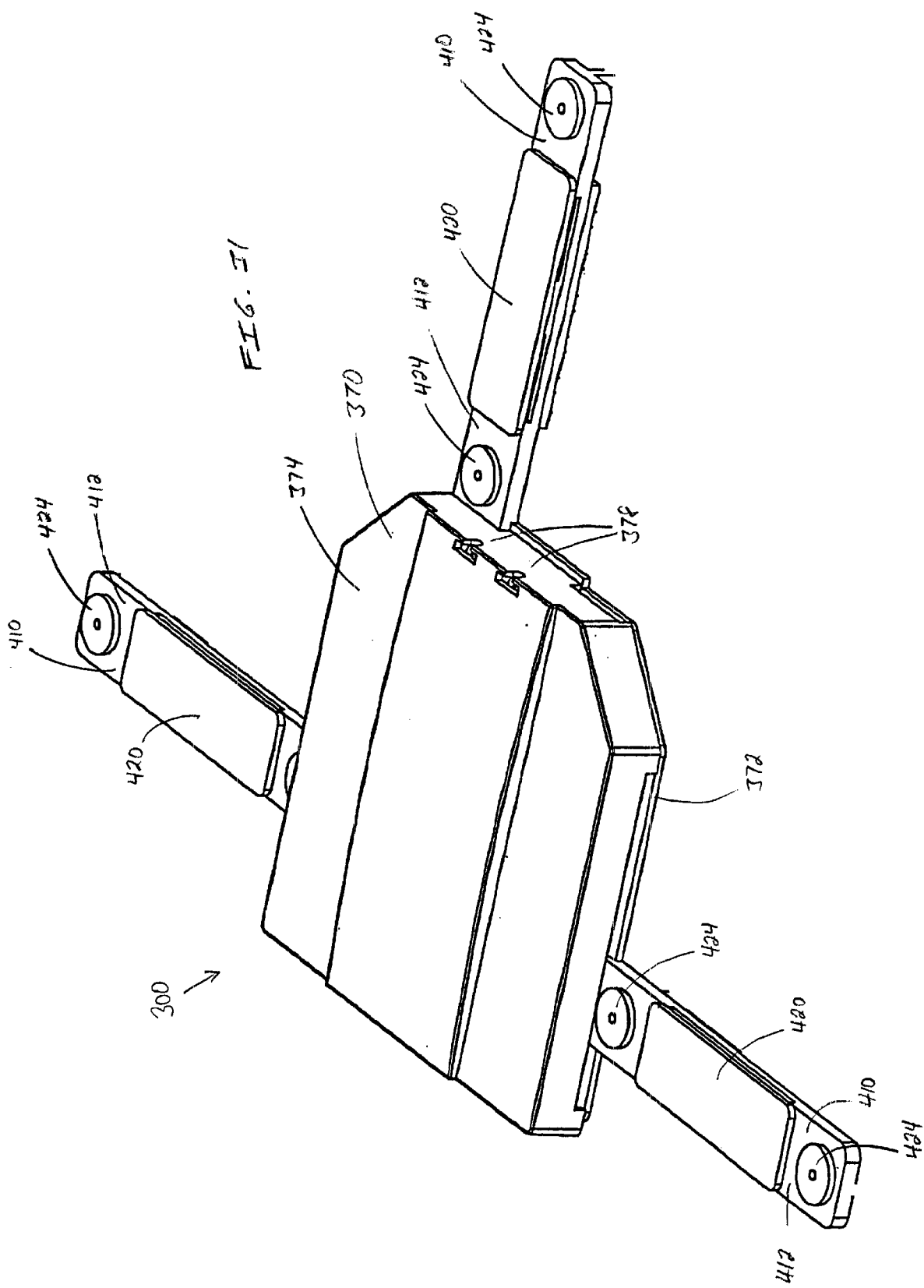

APPARATUS FOR MONITORING AND/OR CONTROLLING TERMITES

RELATED APPLICATIONS

This application is a continuation-in-part of U.S. patent application Ser. No. 09/644,448, filed on Aug. 23, 2000 (abandoned), and U.S. patent application Ser. No. 09/644,449, filed on Aug. 23, 2000 (abandoned), the disclosures of which are incorporated herein by reference in their entirety.

TECHNICAL FIELD

The present invention is generally directed to the monitoring and/or controlling of termite activity in a selected area and, more particularly, to improved apparatus adapted to enable and enhance such monitoring and/or controlling.

BACKGROUND ART

Many well-known techniques have been developed for inducing termites to establish routes or networks from their foraging channels or tunnels to a monitoring station in order to confirm the occurrence of termite activity in a selected area, and thereafter to arrest further destruction by such insects by causing them to ingest certain types of pesticides, thereby controlling such termite activity. Examples of termite baiting devices are disclosed in U.S. Pat. Nos. 5,555,672 to Thorne et al. and 5,695,776 to Ballard et al. Thorne et al. disclose the use of a non-toxic bait material provided in the form of a chemical composition consisting of an agar mixture, decayed birch, uric acid and water, as well as the use of a delayed-action pesticide such as hydramethylnon. Ballard et al. disclose the use of wood treated with a slow-acting toxicant such as sulfluramid. Unlike the present invention disclosed hereinbelow, none of the presently-known techniques, of which the above-described references are representative, are believed to have adequately addressed structural solutions for attracting, monitoring and/or controlling termite activity while avoiding having to primarily depend on baiting compositions. In particular, while there appears to have been some acknowledgment of the fact that termites are attracted to certain types of surfaces, this line of inquiry has not been sufficiently explored in the development of termite monitoring and/or control. It is thus believed that there remains room for improvement in this area.

DISCLOSURE OF THE INVENTION

The present invention broadly results from the realization that structural paths such as grooves or channels, integrated with a housing for a termite monitoring and/or controlling station or similar device, can be utilized to attract termites to such monitoring and/or controlling station or device.

According to one embodiment of the present invention, a housing is provided for a station or device adapted for monitoring and/or controlling termites or other insects, and which is adapted to be situated in or on soil or sand. The housing contains a substance attractive for termite exploration and/or termite feeding, and comprises at least one wall and at least one surface, which surface defines at least one path attractive to termites. The housing can be adapted to receive a second insect monitoring and/or controlling device.

According to another embodiment of the present invention, a termite monitoring and/or controlling apparatus comprises a wall having an axial length, which wall is adapted for substantially subterranean installation at a ground location. An attractive material suitable for promoting termite activity is disposed proximate to the wall. A structure is disposed at the wall having an elongate volume and defining a path attractive to termites.

The present invention also provides a method for monitoring and/or controlling termites. A locus to be monitored and/or controlled is determined, and a ground covering device is placed on the locus or on a portion thereof, thereby substantially lowering the temperature of the locus or the portion of the locus. A termiticidal composition can be introduced in or on the locus.

According to an additional aspect of the present invention, a termite monitoring and/or controlling apparatus comprises a subterranean portion, an above-ground portion, and means for attaching the above-ground portion to the subterranean portion. The subterranean portion includes a wall having a longitudinal axis, a first attractive material suitable for promoting termite activity disposed proximate to the wall, and a structure disposed at the wall having an elongate volume and defining a path attractive to termites. The above-ground portion includes an enclosure and a second attractive substance disposed in the enclosure.

According to an additional embodiment of the present invention, a termite monitoring and/or controlling apparatus comprises a housing, a first termite attractive material, and a second termite attractive material. The housing is adapted for subterranean installation at a ground location, and includes a wall disposed along a longitudinal axis of the housing. The wall includes a termite attractive channel, and the channel has a plurality of termite attractive apertures. The first termite attractive material is disposed within the housing adjacent to the apertures, and has an axial bore generally parallel with the longitudinal axis. The second termite attractive material is disposed within the axial bore.

According to another embodiment of the present invention, a termite monitoring and/or controlling apparatus comprises a housing, a first termite attractive material, a lid, a second termite attractive material, a deflector member, and a third termite attractive material. The housing has a plurality of termite attractive channels, a partially closed end, and an open end opposing the partially closed end. The channels have a plurality of termite attractive apertures. The housing is adapted for subterranean installation at a ground location. The first termite attractive material has a centrally disposed bore, and is disposed within the housing adjacent to the apertures. The lid has a housing retaining hole and a plurality of termite attractive orifices. The lid is adapted for being positioned substantially flush with the ground location. The open end of the housing is supported by the housing retaining hole. The second termite attractive material is disposed within the lid adjacent to its termite attractive orifices. The deflector member has a platform, an elongate wedge downwardly extending perpendicular to the platform, a wedge slot provided within the elongate wedge, and a plurality of termite attractive grooves provided along the elongate wedge adjacent to the wedge slot. The platform is removably attached to the lid and is adapted for being positioned substantially flush with the ground location. The third termite attractive material is located within the wedge slot of the deflector member adjacent to the grooves.

According to yet another embodiment of the present invention, a termite monitoring and/or controlling apparatus comprises a housing, a first termite attractive material, a core, a second termite attractive material, a lid, a third termite attractive material, a deflector member, and a fourth termite attractive material. The housing has a plurality of termite attractive channels, a partially closed end, and an open end opposing the partially closed end. The channels have a plurality of termite attractive apertures. The housing is adapted for subterranean installation at a ground location. The first termite attractive material has a centrally disposed bore, and is disposed within the housing adjacent to the apertures. The core has a jacket, a partially opened end, and an open end. The jacket has a plurality of termite attractive slits, and is positioned within the centrally disposed bore of the first attractive material. The open end of the core rests against the partially closed end of the housing within the housing. The second termite attractive material is located within the core and is adjacent to the slits. The lid has a housing retaining hole therein, and a plurality of termite attractive orifices. The open end of the housing is supported by the housing retaining hole. The lid is adapted for being positioned substantially flush with the ground location. The third termite attractive material is disposed within the lid adjacent to the orifices. The deflector member has a platform, an elongate wedge downwardly extending from the platform, a wedge slot provided within the elongate wedge, and a plurality of termite attractive grooves provided along the elongate wedge adjacent to the wedge slot. The platform is removably attached to the lid, and is adapted for being positioned substantially flush with the ground location. The fourth termite attractive material is located within the wedge slot of the deflector member adjacent to the grooves.

According to still another embodiment of the present invention, a termite monitoring and/or controlling apparatus comprises a housing, a first termite attractive material, a second termite attractive material, a tray, and a third termite attractive material. The housing is adapted for subterranean installation at a ground location. The housing includes a wall disposed along a longitudinal axis of the housing. The wall includes a termite attractive channel. The channel includes a plurality of termite attractive apertures. The first termite attractive material is disposed within the housing adjacent to the apertures, and includes an axial bore generally parallel with the longitudinal axis. The second termite attractive material is disposed within the axial bore. The tray extends transversely with respect to the housing. The third termite attractive material is disposed adjacent to a surface of the tray.

According to a further embodiment of the present invention, a termite monitoring and/or controlling apparatus comprises a housing, a first termite attractive material, a second termite attractive material, an enclosure, and a third termite attractive material. The housing is adapted for subterranean installation at a ground location. The housing includes a wall disposed along a longitudinal axis of the housing. The wall includes a termite attractive channel. The channel includes a plurality of termite attractive apertures. The first termite attractive material is disposed within the housing adjacent to the apertures, and includes an axial bore generally parallel with the longitudinal axis. The second termite attractive material is disposed within the axial bore. The enclosure extends generally transversely with respect to the housing. The enclosure includes a tray, a tray cover, and a locking mechanism removably securing the tray cover to the tray. The third termite attractive material is disposed within the enclosure.

In one specific embodiment, the locking mechanism includes a cover locking tab formed in the tray, a tapered resilient vertical tab formed in the tray and disposed adjacent to the cover locking tab, and a locking tab receptacle formed in the tray cover and adapted for engagement with the cover locking tab.

According to an additional aspect of the present invention, a key device is provided, and is adapted for insertion into the locking tab receptacle and for engagement with the cover locking tab so as to assist in unlocking and thereby disengaging the tray cover of the enclosure from the tray.

According to any of the above-recited embodiments in which the second termite attractive material is disposed within the axial bore of the first termite attractive material, a further embodiment is provided in which the second termite attractive material is partitioned into a plurality of second termite attractive material subcomponents. Each subcomponent extends generally in parallel with the longitudinal axis of the housing and is spaced from the other subcomponents so as to create additional termite attractive surfaces.

In addition, an embodiment is provided in which a core is disposed within the axial bore of the first termite attractive material. The core includes a partitioning structure defining a plurality of axially oriented core subsections. Each second termite attractive material subcomponent is retained by the partitioning structure in a corresponding one of the core subsections.

It is therefore an object of the present invention to provide a housing adapted for use in conjunction with a substance attractive to termite exploration, which housing can be employed to monitor termite activity and/or control termite destruction of nearby structures prone to termite infestation.

It is another object of the present invention to provide a housing that includes structures such as channels or grooves attractive to termite exploration.

It is yet another object of the present invention to provide a housing adapted to attract termite exploration and which can be installed in a subterranean environment.

It is still another object of the present invention to provide a termite monitoring and/or controlling device for use in a subterranean environment, which is adapted to receive and cooperate with a second termite monitoring and/or controlling device adapted for use in an above-ground environment.

It is a further object of the present invention to provide a termite monitoring and/or controlling device adapted to receive and cooperate with a termite deflecting structure.

Some of the objects of the invention having been stated hereinabove, other objects will become evident as the description proceeds when taken in connection with the accompanying drawings as best described hereinbelow.

BRIEF DESCRIPTION OF THE DRAWINGS

FIG. 4B is a perspective view of the bottom side of the cover illustrated in FIG. 4A;

FIG. 8B is a perspective view of the bottom side of the second device illustrated in FIG. 8A;

FIG. 10 is a diagram illustrating the housing of FIG. 2 connected to an elongate component according to the present invention;

FIG. 12 is an exploded view of a termite monitoring and/or controlling station according to a third embodiment of the present invention;

FIG. 16 is a partial cross-sectional view of the housing illustrated in FIG. 15;

FIG. 17 is a partial cross-sectional view of the housing illustrated in FIG. 15, wherein wooden dowels are provided;

FIG. 19A is an exploded view of the lid illustrated in FIGS. 18A through 18C;

FIG. 19B is an exploded view of an alternative embodiment of the lid illustrated in FIGS. 18A through 8C;

FIG. 20 is a perspective view of the lid illustrated in FIGS. 18A through 18C supporting the housing;

FIG. 23 is a perspective view of the lid positioned substantially flush with a ground location;

FIG. 24 is a perspective view of the housing prior to being inserted into the ground location in combination with the lid;

FIG. 25 is a perspective view of a second material such as one or more wooden dowels being inserted into the core;

FIG. 26 is a perspective view illustrating the removal of excess length of the second material;

FIG. 28 is a perspective view illustrating the installation of anchoring spikes into the spike orifices of the tray of the lid;

FIG. 30 is a partially exploded view of the termite monitoring and/or controlling station in accordance with the present invention; and FIG. 31 is a perspective view of a fully assembled termite monitoring and/or controlling station in accordance with the present invention.

DETAILED DESCRIPTION OF THE INVENTION

First Embodiment of the Invention

Figure 1:
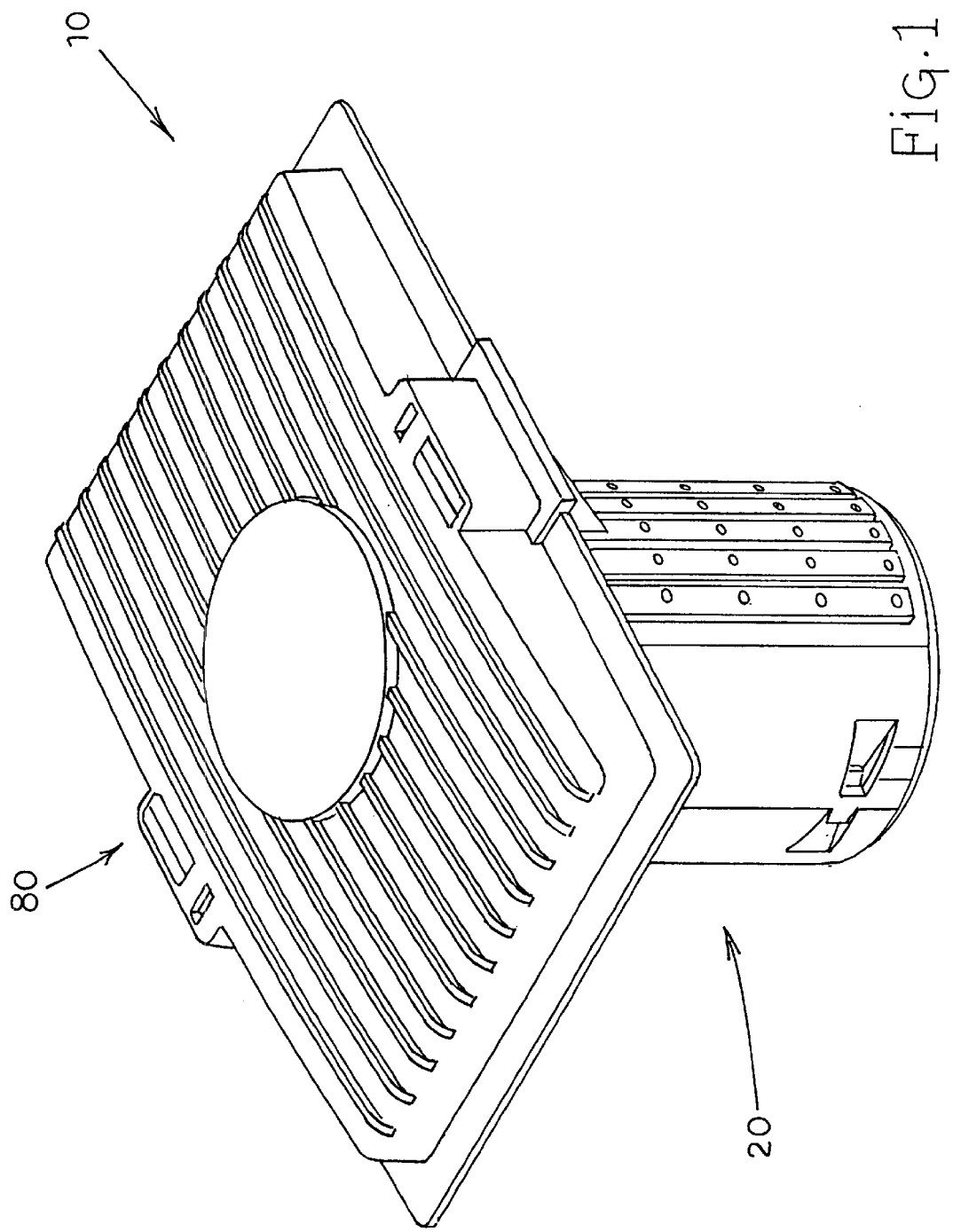
FIG. 1 is a perspective view of a termite monitoring and/or controlling station in assembled form according to one embodiment of the present invention.
Figure 2:
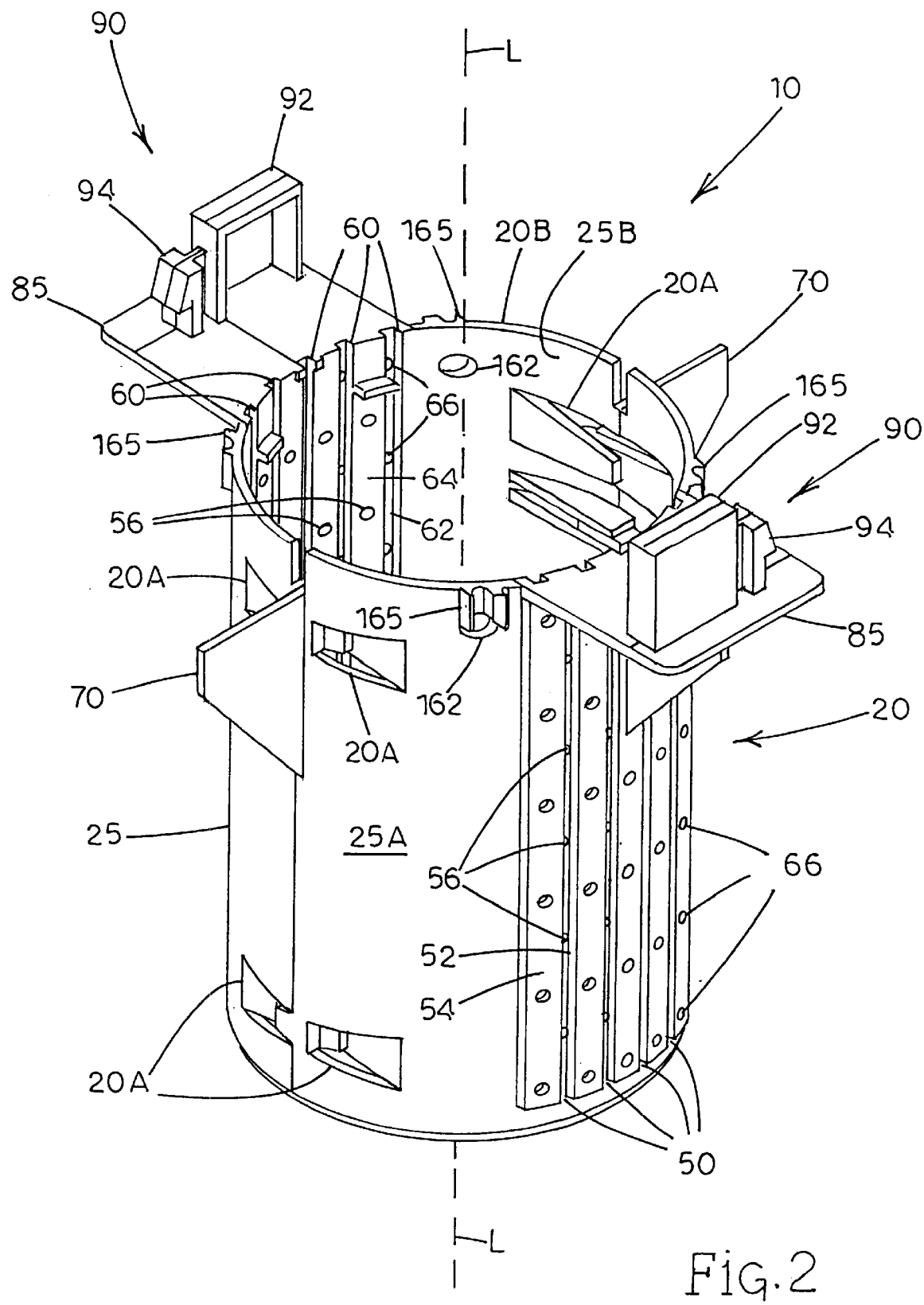
FIG. 2 is a perspective view of a housing adapted for use in conjunction with the termite monitoring and/or controlling station illustrated in FIG. 1.
Figure 2A:
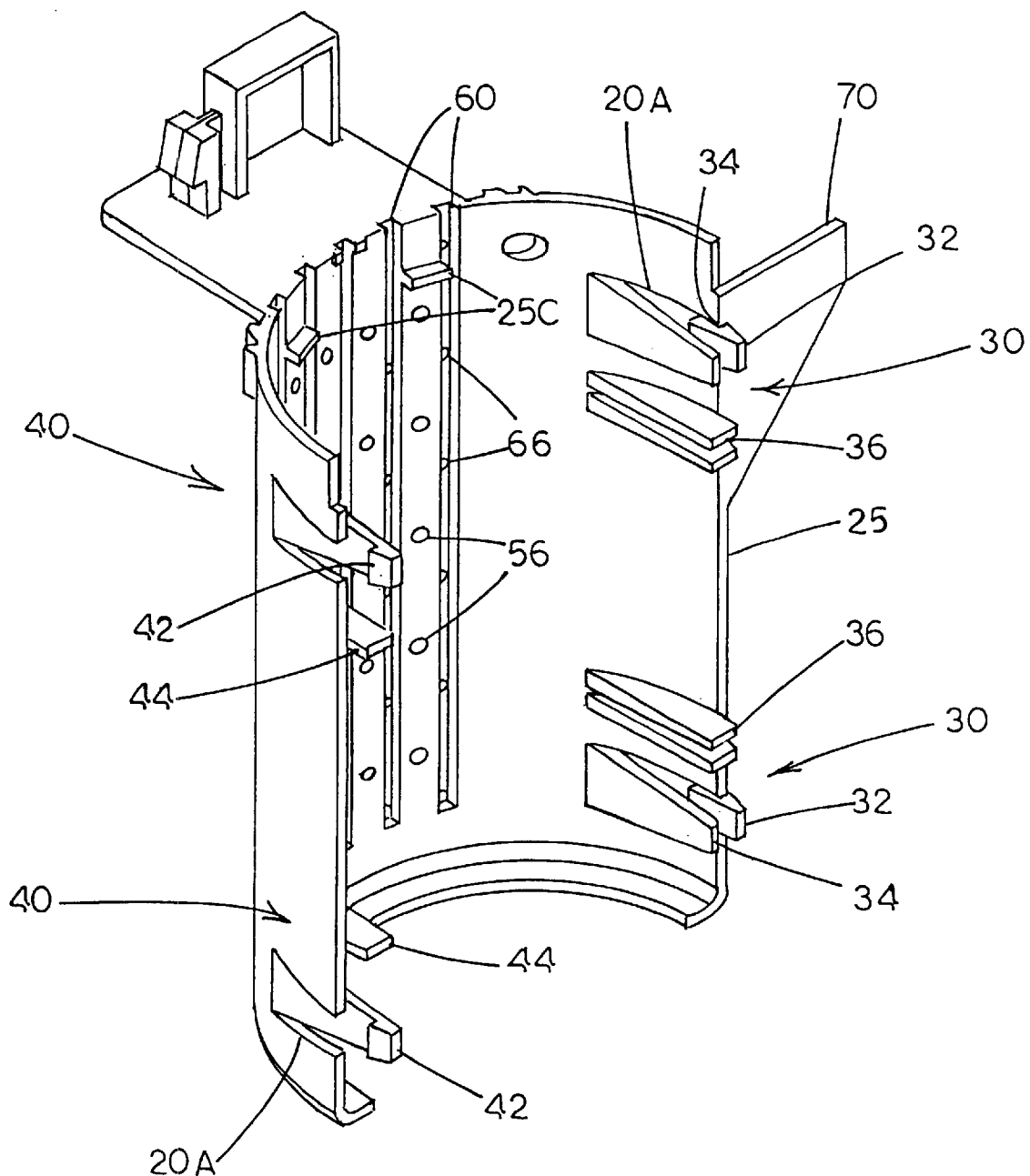
FIG. 2A is a perspective view of a half-section of the housing illustrated in FIG. 2.

Referring now to FIGS. 1–4B, a termite or other insect monitoring and/or controlling station or device, generally designated 10, is illustrated according to one embodiment of the present invention. Station 10 includes a housing generally designated 20. Housing 20 can be cylindrical as shown in FIGS. 1, 2 and 2A, or can have some other shape or profile such as square, triangular, conic, pyramidal, or the like. As shown in FIG. 2, housing 10 generally includes at least one wall 25 defining an exterior surface 25A and/or an interior surface 25B. In the embodiment shown in FIGS. 2 and 2A, cylindrical housing 20 is formed by securing two semi-cylindrical halves together. For example, as best shown in FIG. 2A, each half of housing 20 can be provided with one or more complementary securing or interlocking arrangements generally designated 30 and 40, respectively, cooperating with various openings 20A on housing 20. Each securing arrangement 30 in the illustrated example includes a tapered, resilient side tab 32, a vertically oriented slot 34, and a horizontally oriented slot 36, all of which are formed on or attached to housing wall 25. Each complementary securing arrangement 40 includes a tapered, resilient side tab 42 and a planar tab 44, also formed on or attached to housing wall 25. Each side tab 42 is adapted for insertion through one of vertically oriented slots 34 and for locking engagement with one of openings 20A of housing 20, each side tab 32 is adapted for locking engagement with one of openings 20A of housing 20, and each planar tab 44 is adapted for insertion into one of horizontally oriented slots 36 extending from wall 25. Housing 20 can be constructed from a plastic material or from a substance that is attractive, penetrable and/or digestible by termites. Housing 20 can also be transparent if desired.

An important aspect of the present invention resides in the fact that housing 20 is structured to define at least one path on exterior surface 25A and/or interior surface 25B of housing wall 25, but preferably at least on exterior surface 25A, which path is attractive to foraging termites. In the exemplary embodiment of housing 20 shown in FIGS. 2 and 2A, the path takes the form of a channel 50 or 60 running along the axial length of wall 25 of housing 20. As shown, several such channels 50 and 60 can be provided, either along exterior surface 25A and/or interior surface 25B but, preferably, at least along exterior surface 25A. Hence, in FIGS. 2 and 2A, both exterior and interior channels 50 and 60 respectively are illustrated. Channel or channels 50 or 60 can present any number of cross-sectional profiles, such as substantially square, rectilinear, circular, semi-circular, triangular, oval, semi-oval, L-shaped, T-shaped, or X-shaped. It is further preferable that at least one of the dimensions of the cross-section of channel 50 or 60 (e.g., depth, width, diameter, or the like) be in the range of approximately 3 to approximately 5 mm. In addition, channels 50 or 60 can be oriented substantially parallel to a longitudinal axis L of housing 20 and lead toward an open end 20B of housing 20. Alternatively, channels 50 or 60 can be oriented substantially along a spiral or helical direction with respect to longitudinal axis L, or substantially orthogonal thereto.

Importantly, each channel 50 or 60 must provide an elongate volume in and through which termites would be wont to travel and construct mud tubes as part of their excursions to and from their nesting areas. Channels 50 or 60 can be formed integrally with the construction of housing wall 25, such as by forming recesses 52 or 62 directed into the material of wall 25 or adjacent projections 54 or 64 protruding out from wall 25, or can be provided as separate pieces attached or secured to housing wall 25. In the embodiment shown in FIGS. 2 and 2A, channels 50 or 60 generally take the form of troughs or grooves 52 or 62 which are defined by adjacent ridges or projections 54 or 64. Accordingly, when a plurality of channels 50 or 60 are provided, each section of housing wall 25 that includes a group of adjacent channels 50 or 60 could be considered from a cross-sectional perspective as having a corrugated profile defined by alternating ridges 54 or 64 and troughs 52 or 62.

As further illustrated in FIGS. 2 and 2A, housing 20 can be provided with one or more wing-like projections or surfaces 70, either integral with or attached to housing wall 25, to serve as additional surfaces to guide or entice termites to housing 20.

Preferably, housing 20 is provided with a means of termite ingress to housing and/or egress from housing 20, within a path of housing 20 and at intermediate points along the axial length of housing 20. Thus, in FIGS. 2 and 2A, each interior channel 60 provided on housing 20 has a series of linearly spaced apertures 66 and each exterior channel 50 has a series of linearly spaced apertures 56. In this preferred configuration, an aperture 56 or 66 is always available for a termite whether traveling from inside or outside of housing wall 25. Apertures 56 or 66 can present any number of cross-sectional profiles, such as substantially square, rectilinear, circular, semi-circular, triangular, oval, semi-oval, L-shaped, T-shaped, or X-shaped. The area of the cross-section of each aperture 56 or 66 is preferably in the range of approximately 3 to approximately 5 mm.

Figure 3:
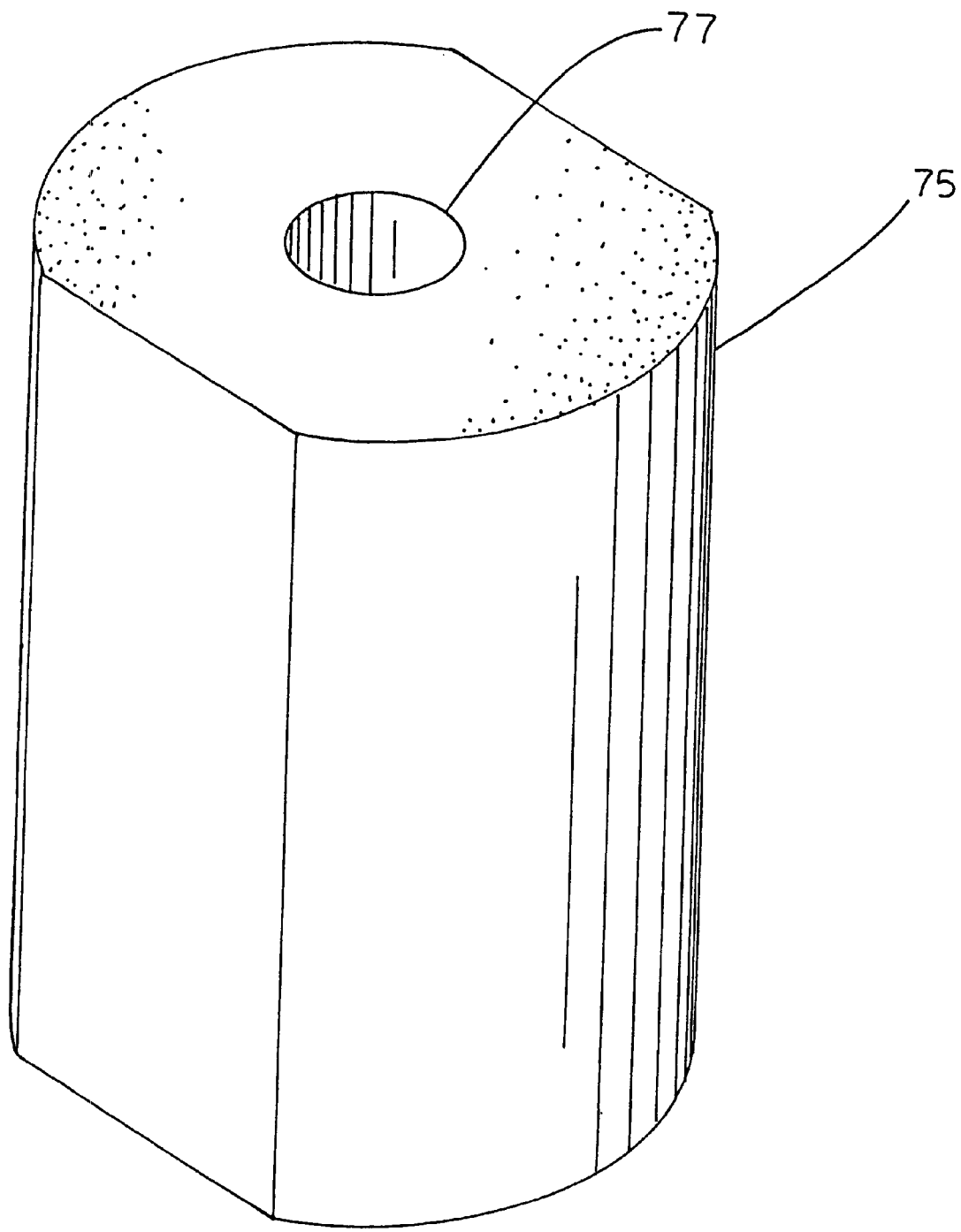
FIG. 3 is a perspective view of a substance attractive to termites and adapted for insertion in and use in conjunction with the housing illustrated in FIG. 2.

Referring to FIG. 3, housing 20 is adapted to contain, or at least be adjacent to or in close proximity to, an attractive substance 75 suitable for promoting or inviting termite exploration and/or termite feeding, such as a floral foam type of material. Attractive substance 75 could be a digestible (i.e., a food source) material. The attractive attribute or property accorded to or presented by attractive substance 75 could be physical, chemical or comestible in nature. Attractive substance 75 can further include or contain a termiticide. Preferably, attractive substance 75 is wetted to produce a cool, damp or humid environment intended to further promote or invite termite exploration, burrowing and/or feeding. In use, attractive substance 75 can be rewetted periodically as needed. Attractive substance 75 can further have a bore 77 formed through its axial length in order to provide access to a probing or observational instrument to assist in detecting the occurrence of termite activity within housing 20. Referring back to FIGS. 2 and 2A, housing wall 25 can include one or more spacers 25C projecting from interior surface 25A for the purpose of maintaining the position of attractive substance 75 substantially concentric with housing wall 25, or of providing an amount of radial spacing between attractive substance 75 and housing wall 25, or of serving as retaining clips to maintain an axial position of attractive substance 75 with respect to housing 20.

In use, housing 20 with attractive substance 75 therein is preferably installed in a hole bored into the ground, such as soil or sand, so that housing 20 and attractive substance 75 operate in a substantially subterranean environment. Evidence of termite activity can be found by periodically inspecting attractive substance 75 through open end 20B of housing 20 defined by the top edge of housing wall 25 and/or by removing attractive substance 75 from housing 20 through open end 20B, which can be accomplished without disturbing housing 20 in its installed state.

Figure 4A:
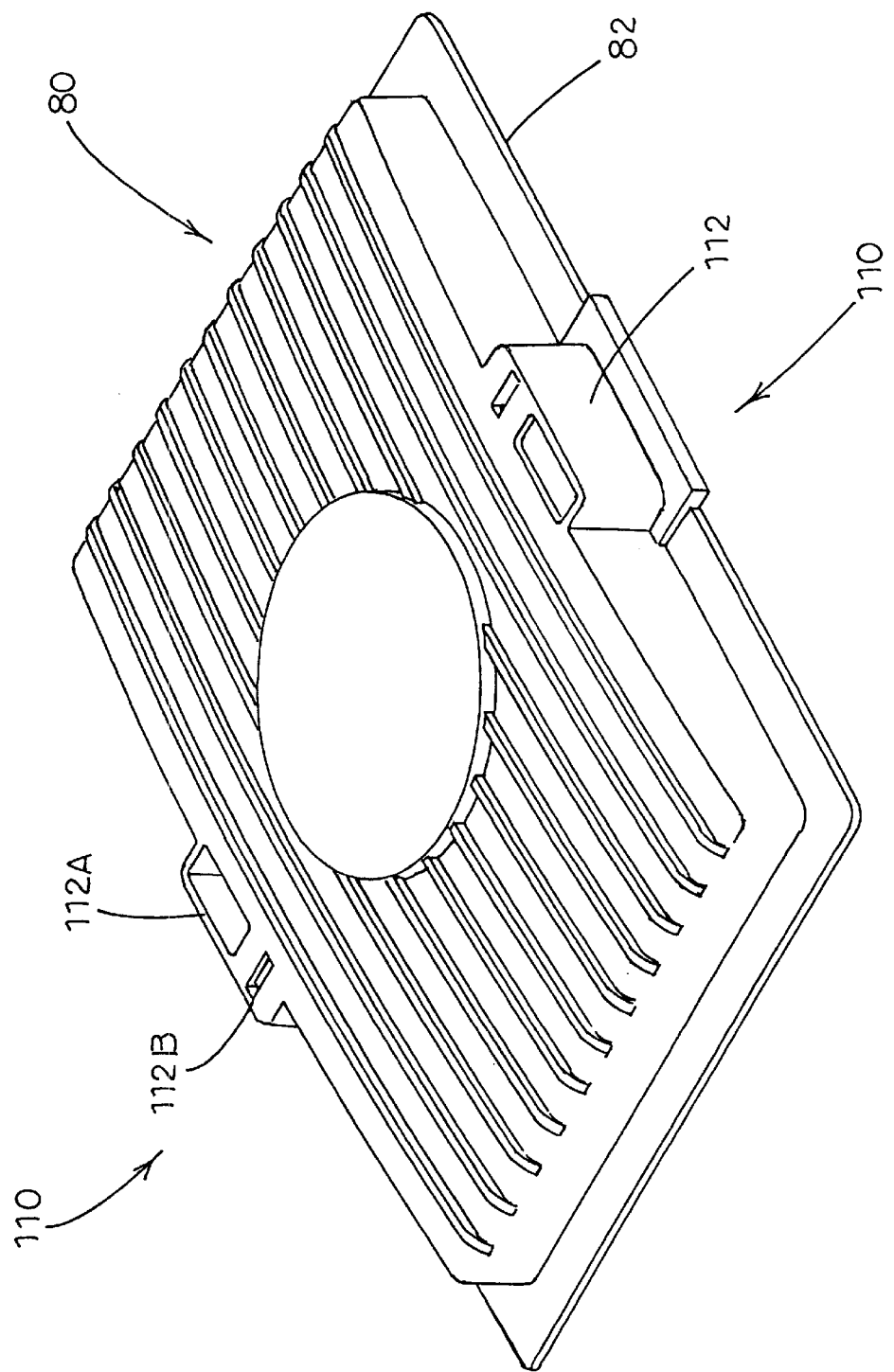
FIG. 4A is a perspective view of the top side of a cover adapted for use with the housing illustrated in FIG. 2.

Referring to FIGS. 4A and 4B in conjunction with FIGS. 1, 2A, and 2B, a cover generally designated 80 can be provided for use in combination with housing 20. Cover 80 is useful for shielding housing 20 and attractive substance 75 from the heating and desiccating effects wrought by aboveground atmospheric conditions, in order to maintain a damp and cool environment within housing 20 and attractive substance 75 as well as in the vicinity around housing 20 below cover 80. Cover 80 is also useful in identifying the location of housing 20 after housing 20 has been installed in a ground location, FIG. 1 illustrates cover 80 installed onto housing 20. In use, cover 80, or at least its lower lip 82, would be substantially flush with the ground surface at the area where housing 20 is to operate.

Cover 80 can be accommodated by providing housing 20 with one or more support plates 85, which are either integral with or attached to housing 20, as best shown in FIG. 2. Cover 80 can be installed in an interlocking relation with housing 20 by providing housing 20 with securing means generally designated 90 adapted for engagement with complementary cover securing means generally designated 110. In the exemplary embodiment, housing securing means 90 includes mounting posts 92 and tapered, resilient housing locking tabs 94. Both mounting posts 92 and housing locking tabs 94 extend upwardly from support plates 85. Cover securing means 110 includes receptacles 112 and tapered cover locking tabs 114 depending downwardly from the underside of cover 80. On the top of cover 80, each receptacle 112 has an aperture 112A and a slot 112B. In use, cover 80 is fitted onto housing 20 by aligning receptacles 112 with corresponding mounting posts 92 and pushing cover 80 downwardly such that mounting posts 92 are received in receptacles 112 and a shoulder surface of each housing locking tab 94 engages with a shoulder surface of corresponding cover locking tab 114. With this configuration, cover 80 can be removed from housing 20 by inserting a screwdriver or other suitable implement into slot 112B to force the respective shoulder surfaces to disengage from each other, and by grasping cover 80 while pushing on mounting posts 92 through apertures 112A.

Second Embodiment of the Invention

Figure 9:
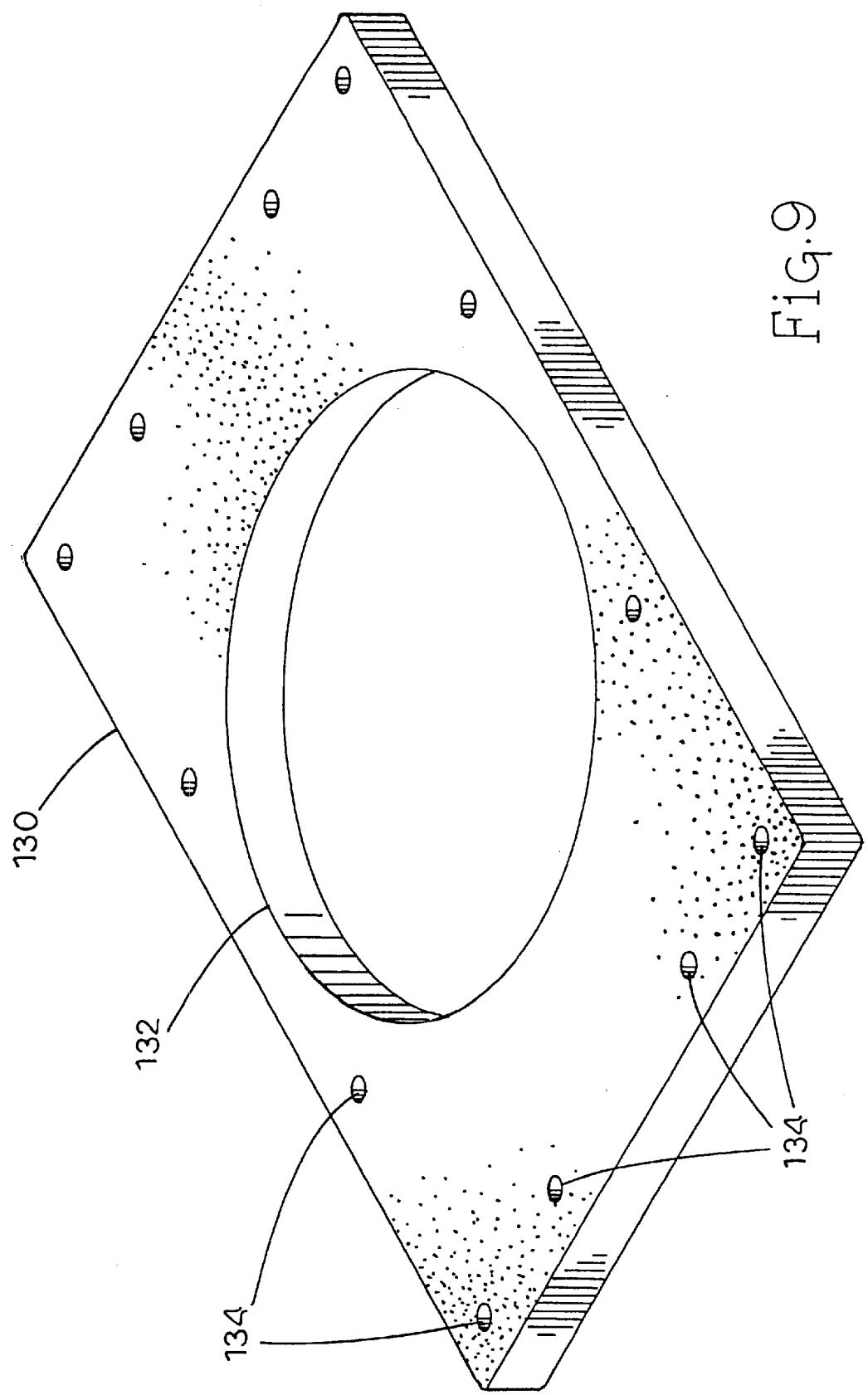
FIG. 9 is a perspective view of a second attractive substance adapted for installation in the second device illustrated in FIG. 8A.

Referring to FIGS. 5–9, a second embodiment of the monitoring and/or control station or device, generally designated 115, is illustrated in accordance with the present invention, wherein a second insect monitoring and/or controlling device generally designated 120 (see FIG. 6) is cooperatively provided in combination with station 10. As shown in FIGS. 8A, 8B and 9, a plate or tray generally designated 122 has an upwardly extending lip 124, a central aperture 126 and one or more laterally disposed apertures 128. Tray 122 is adapted to contain an attractive substance 130 which, similar to attractive substance 75 contained within housing 20, is suitable for promoting or inviting termite exploration and/or termite feeding. Accordingly, attractive substance 130 of second monitoring and/or controlling device 120 can likewise be constructed from a floral foam type of material, and can further include or contain a termiticide. In use, attractive substance 130 is preferably wetted to produce a cool, damp or humid environment intended to further promote or invite termite exploration, burrowing and/or feeding. Attractive substance 130 has a central aperture 132 and one or more laterally disposed apertures 134.

Figure 5:
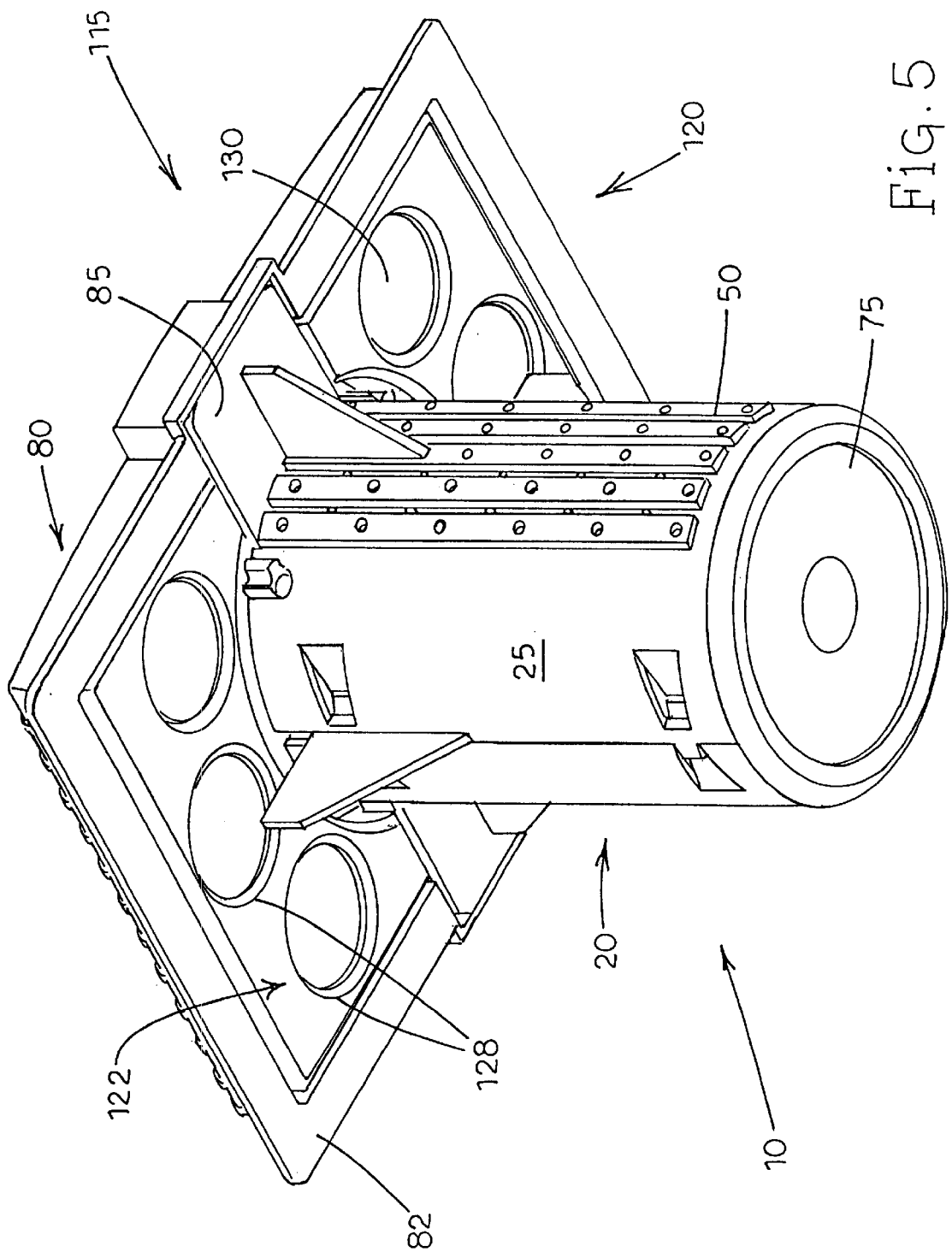
FIG. 5 is a perspective view of a combined subterranean and above-ground termite monitoring and/or controlling station in assembled form according to another embodiment of the present invention.
Figure 6:
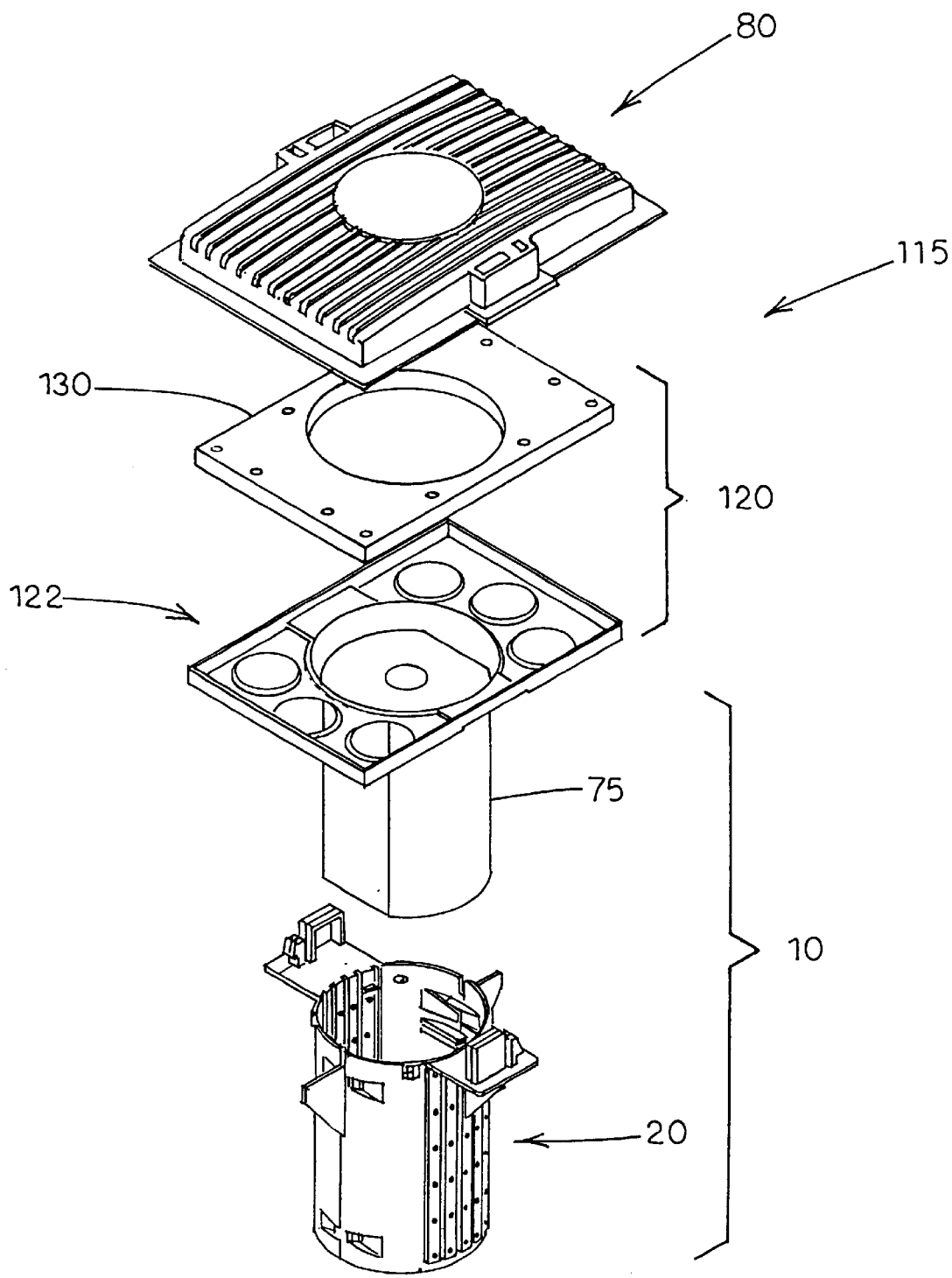
FIG. 6 is a perspective exploded view of the embodiment illustrated in FIG. 5.

Referring to the respective assembled and exploded views of monitoring and/or control station or device 115 shown in FIGS. 5 and 6, above-described housing 20 associated with monitoring and/or controlling station 10 can be adapted to receive second monitoring and/or controlling device 120. For this purpose, and as illustrated in conjunction with the exemplary embodiment now being described, attractive substance 130 is intended to be removably disposed in the internal volume defined by tray 122, and tray 122 is mounted on support plates 85 of housing 20 and hence held in place between housing 20 and cover 80. When fully assembled as shown in FIG. 5, a bottom section of tray 122 is substantially level with lower lip 82 of cover 80 and thus substantially flush with the ground surface. Second device 120 can thus operate as an above-ground monitoring and/or controlling means while station 10 with housing 20 operates as a below-ground or subterranean monitoring and/or controlling means. Respective central apertures 126, 132, of tray 122 and attractive substance 130 of second monitoring and/or control device 120 facilitate access and inspection of housing 20 and/or attractive substance 75 associated with housing 20. Laterally disposed apertures 128 on tray 122 provide means for ingress to and egress from attractive substance 130 by termites. The various surfaces shown in FIG. 5, including channels 50 or 60, housing wall 25, support plates 85, and bottom section of tray 122, generally provide access means by which termites are encouraged to travel between housing 20 and second monitoring and/or controlling device 120. In addition, as best shown in FIG. 9, laterally disposed apertures 134 of attractive substance 130 entice or promote termites to enter such apertures 134 and consequently explore or forage within the material constituting attractive substance 130.

It can be seen that second device 120 of control station or device 115, comprising tray 122 and attractive substance 130, as well as cover 80, have the effect of "shadowing" housing 20 and areas immediately proximate thereto by creating a barrier to sunlight and acting as a condensation trap. As a result, both attractive substances 75 and 130 are kept damp, and the soil or sand situated beneath second device 120 is kept humid and cool, according to psychrometric principles, thereby maintaining an optimal environment for attracting termites to housing 20.

Figure 7:
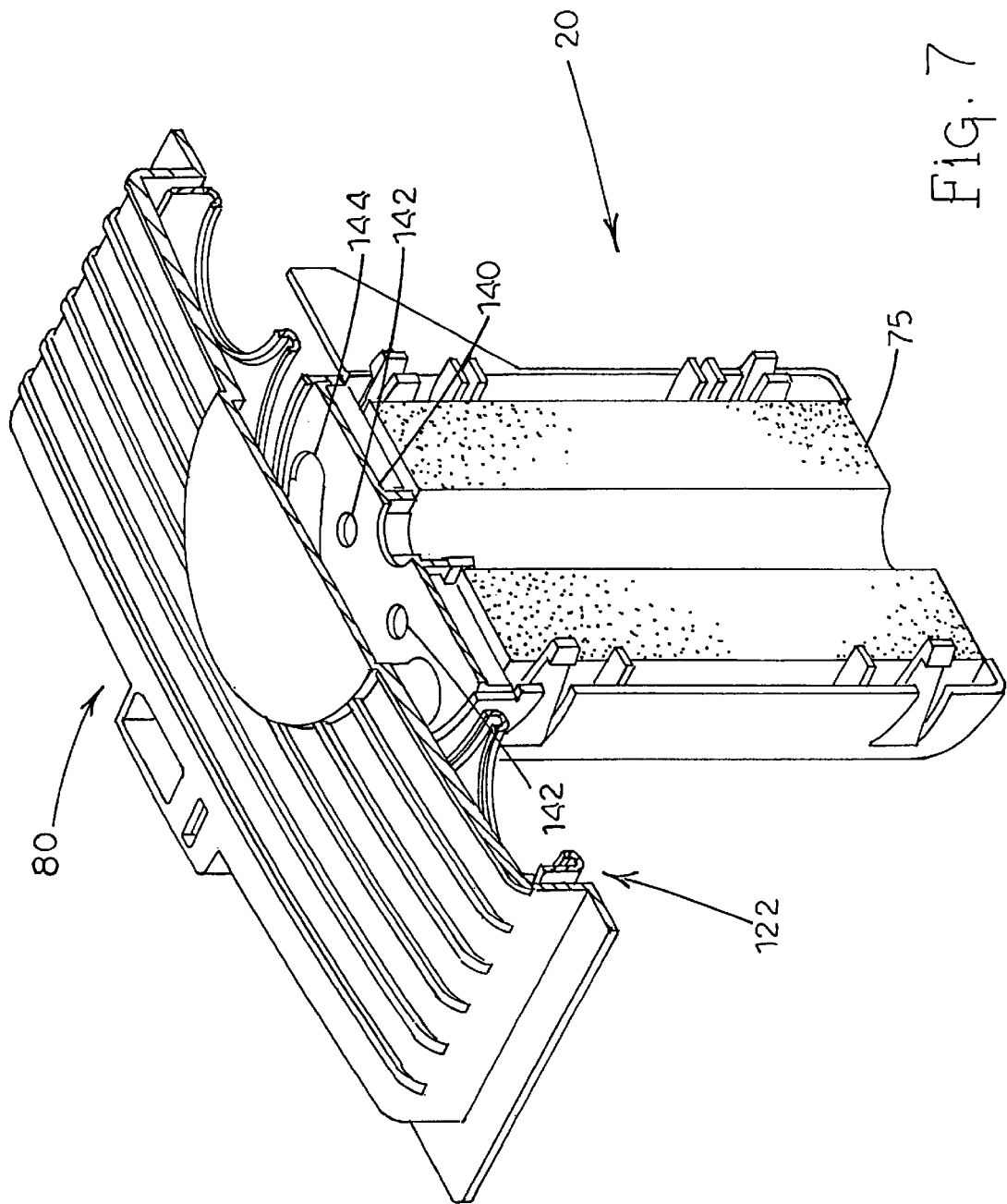
FIG. 7 is a perspective cut-away view of the embodiment illustrated in FIG. 5.
Figure 8A:
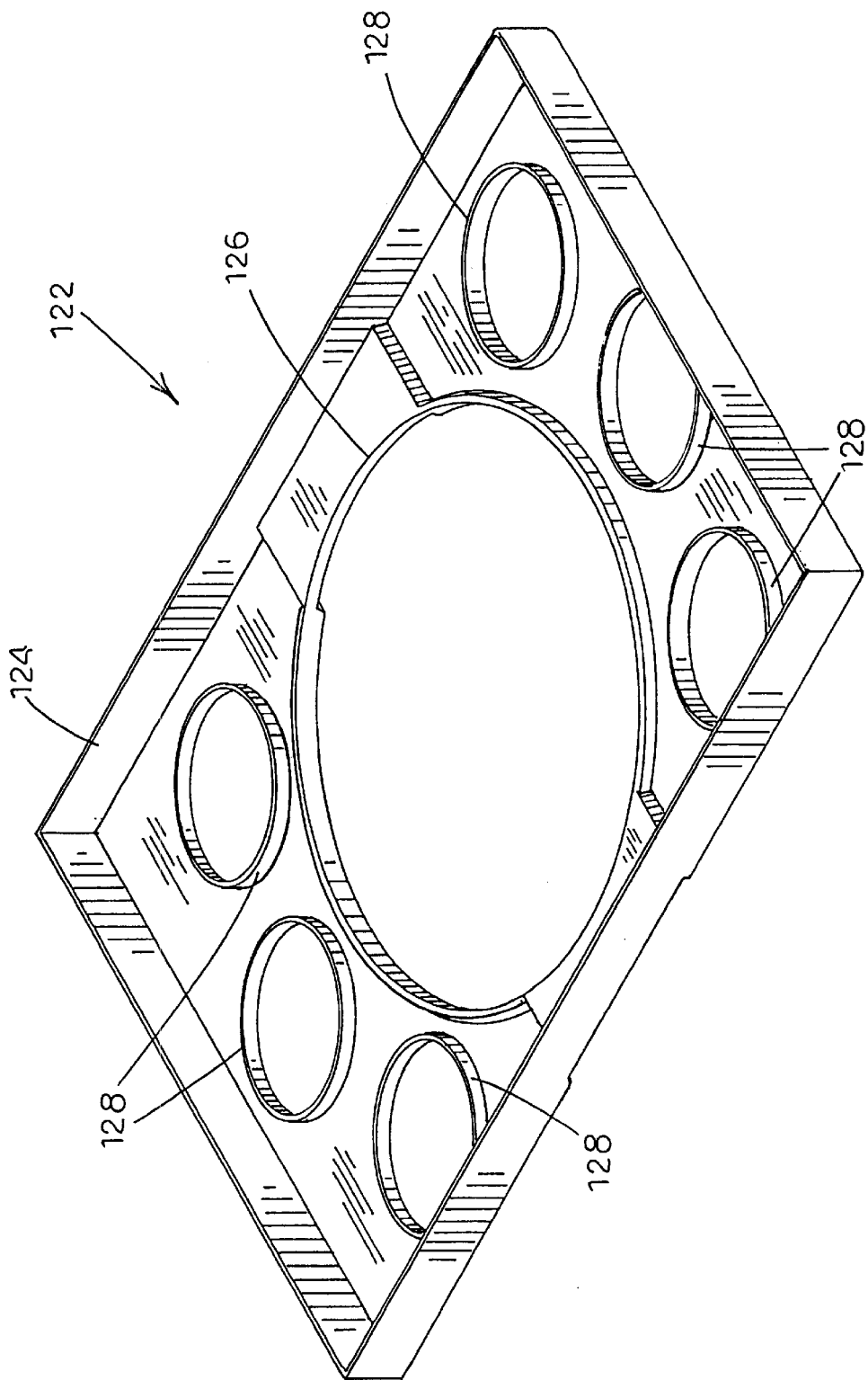
FIG. 8A is a perspective view of the top side of a second termite monitoring and/or controlling device for use in the second embodiment of the termite monitoring and/or controlling station shown in FIG. 5 according to the present invention.

Referring to the cross-sectional view of FIG. 7, a central plate 140 (of which only a half portion is shown) can be disposed within the uppermost interior of housing 20 to stabilize attractive substance 75 and keep it in place. Central plate 140 has holes such as circular apertures 142 and arcuate aperture 144 to provide access for observation of attractive substance 75 and/or for sensing or probing instruments.

Referring back to FIG. 2, housing 20 could be provided with means for interfacing with additional means for attracting termites to housing 20. Such means could include wedge or plate-shaped surfaces, similar to surfaces 70 but provided independently of devices 10 and/or 120. Such additional means could be used to intercept the course of a termite in order to redirect the termite towards housing 20. In one particular embodiment illustrated in FIG. 2 in combination with FIGS. 10 and 11A–11D, housing 20 has one or more insertion apertures 162 bored through housing wall 25 and further includes water insertion recesses 165 formed in or on housing 20 or attached thereto. In FIG. 2, by way of example, housing 20 includes four water insertion recesses 165, two of which are shown positioned above corresponding insertion apertures 162 with the understanding that additional insertion apertures 162 would also be disposed below the other two respective water insertion recesses 165.

As shown in FIG. 10, each insertion aperture 162 is adapted to receive an elongate component 170 such that elongate component 170 is directed at a downward and outward angle with respect to housing 20 (e.g., 45E). Alternatively, each elongate component 170 could extend straight and radially outwardly from housing 20. In either configuration, elongate components 170 are connected to housing 20 and serve to expand the effective range of influence of station 10 in attracting termites to housing 20, by intercepting the natural paths of termites foraging in the vicinity of housing 20 and redirecting or at least encouraging such termites to travel toward housing 20. Elongate components 170 are also useful for spacing housing 20 at a distance from the foundation of a building or other structure in order to direct termites sway from such structure since, given space limitations and clearance required when using augers and other boring devices, it is difficult and impracticable to install station 10 or other monitoring and/or controlling devices immediately adjacent to such structures.

Figure 11C:
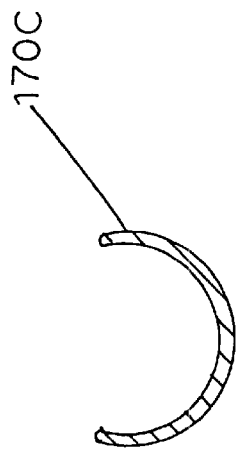
FIGS. 11A–11D are cross-sectional views illustrating various possible cross-sectional profiles for the elongate component of FIG. 10.
Figure 11D:
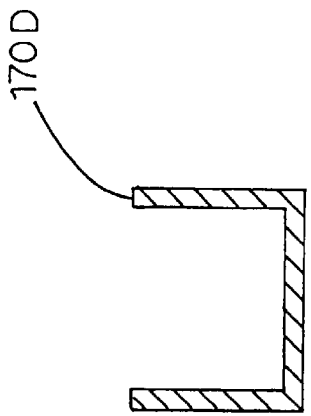
Figure 11A:
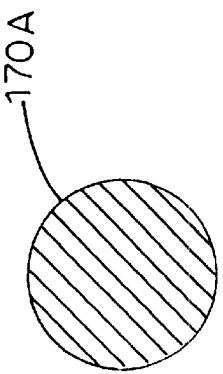
Figure 11B:
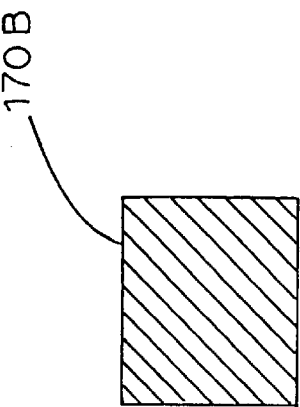

As shown in FIGS. 11A and 11B, respectively, elongate component 170 could be constructed in the form of a cylindrical rod 170A or a rectilinear beam 170B, or alternatively have some other suitable cross-sectional profile. Elongate components 170 could further cooperate with corresponding water insertion recesses 165 as a means for maintaining the dampness or moisture content of the area surrounding housing 20. That is, water insertion recesses 165 assist in locating points at which water can be injected or introduced, such as through the use of a syringe-type instrument, onto elongate components 170. As shown in FIGS. 11C and 11D, respectively, the water distribution function of elongate components 170 can be enhanced constructing elongate components 170 with a channel or trough-like profile, such as elongate component 170C or elongate component 170D.

Third Embodiment of the Invention

Referring now to FIGS. 12, 13A, 13B, 14A and 14B, an additional embodiment of the present invention is illustrated. An insect monitoring and/or controlling station, generally designated 300, includes a housing 302. As shown in FIGS. 13A, 13B, 14A and 14B, the housing 302 includes an interior surface 304, an exterior surface 306, an inner retaining ridge 308 defining a partially closed end 310, and an outer rim 312 defining an open end 314, which opposes the partially closed end 310. The interior surface 304 and the exterior surface 306 have a plurality of termite attractive channels 316 provided in the housing 302 along the interior surface 304 and the exterior surface 306, respectively. The channels 316 have a plurality of termite attractive apertures 318 provided therein. The interior surface 304 of the housing 302 also has a number of spacers 320 provided thereon. In addition, the housing 302 also includes an elongate interior void 322 having a central longitudinal axis 324.

Figure 13A:
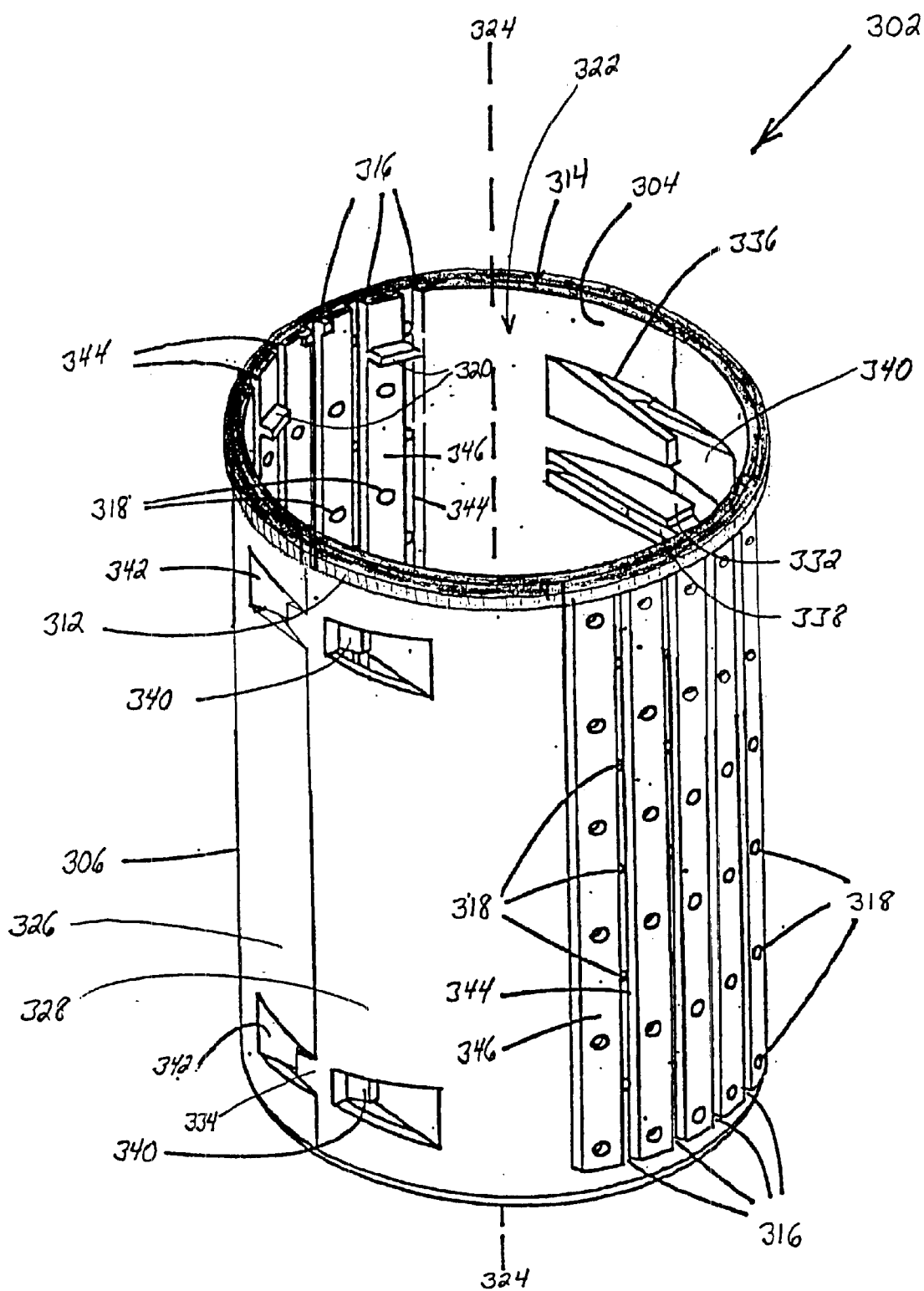
FIG. 13A is a perspective view of a two-piece housing adapted for use in conjunction with the third embodiment of the station illustrated in FIG. 12.
Figure 13B:
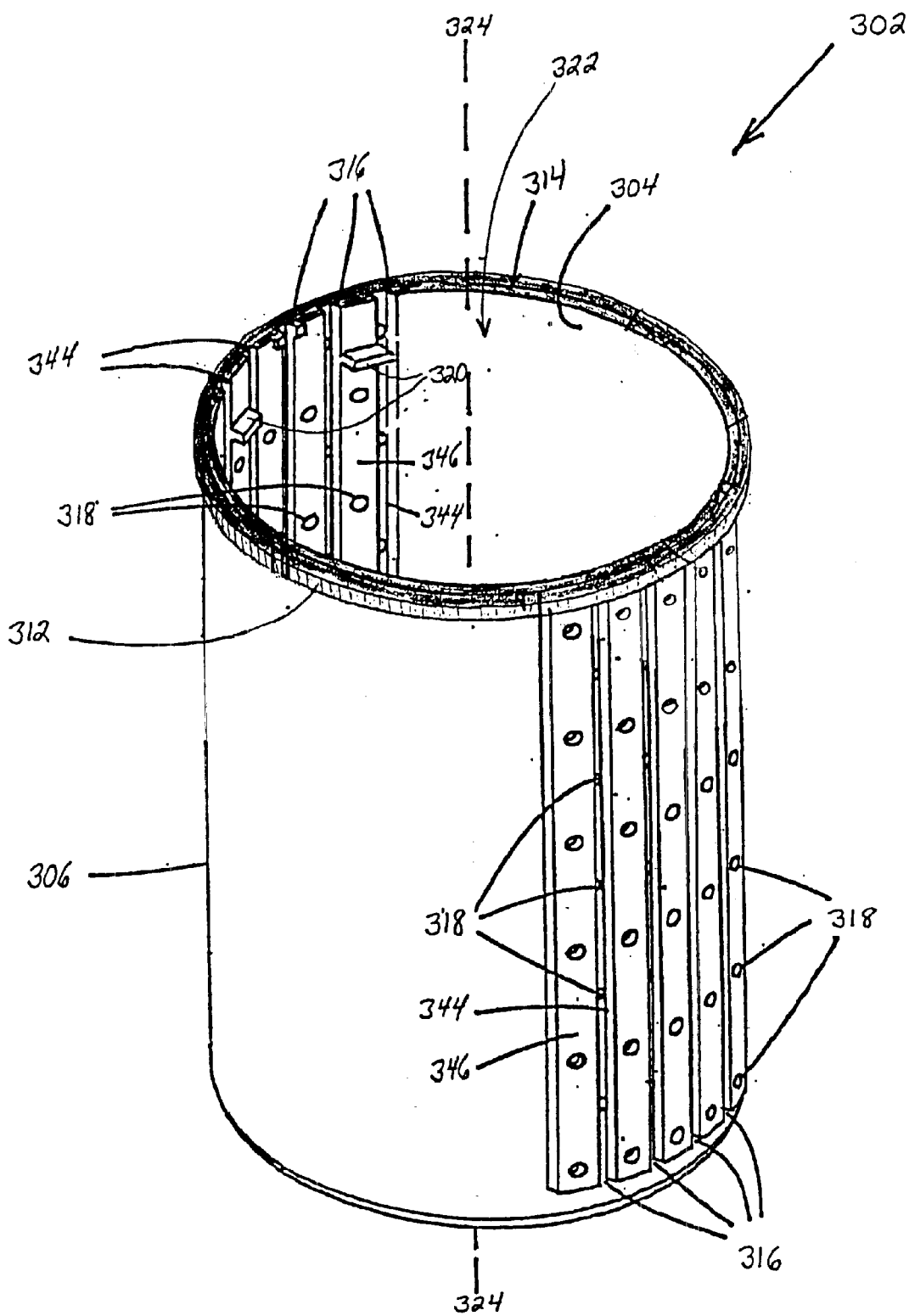
FIG. 13B is a perspective view of a unitary housing adapted for use in conjunction with the third embodiment of the station illustrated in FIG. 12.
Figure 14A:
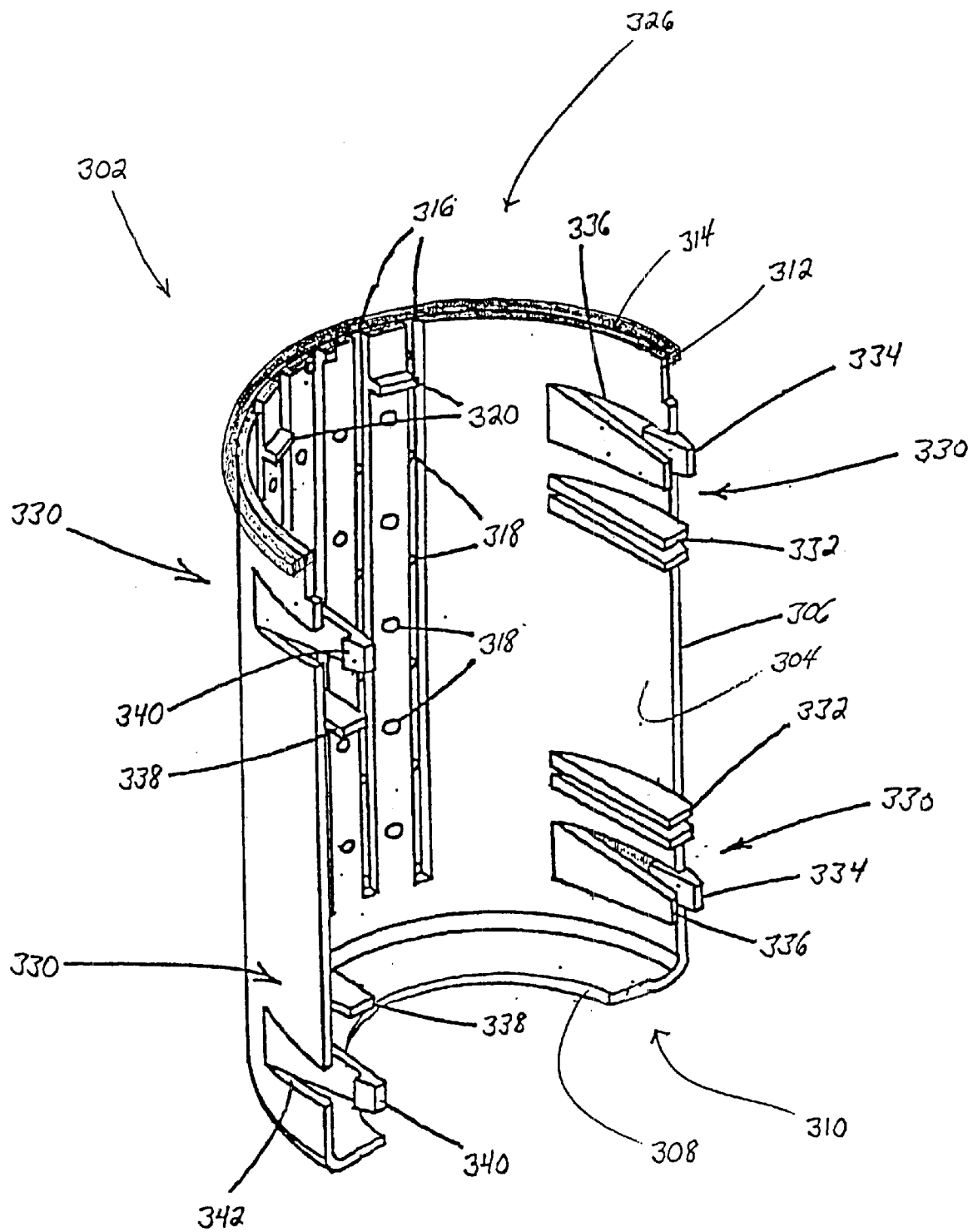
FIG. 14A is a perspective view of a one-half section of the housing illustrated in FIG. 13A.
Figure 14B:
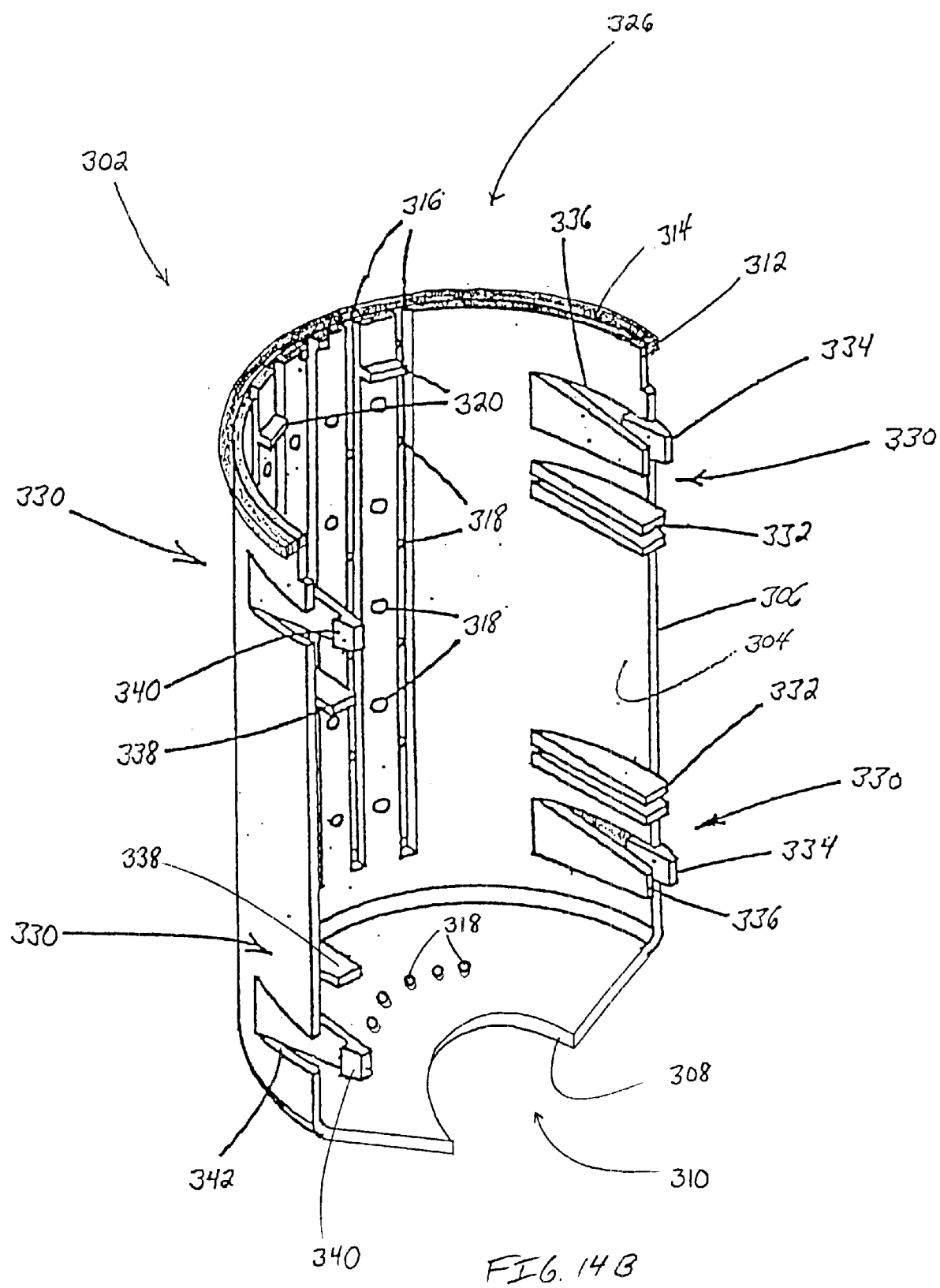
FIG. 14B is a perspective view of a one-half section of the housing illustrated in FIG. 13A, wherein an alternative bottom section of the housing is illustrated.

As shown in FIGS. 13A, 14A and 14B, the housing 302 according to one embodiment is formed by securing a one-half section 326 of the housing 302 together with a second-half section 328 of the housing 302 via a number of complementary securing arrangements 330. The securing arrangement 330 of the one-half section 326, which includes a horizontally oriented slot 332, a locking tab 334, and a vertically oriented slot 336, is secured to the securing arrangement 330 of the second-half section 328, which includes a horizontally planar tab 338, a tapered resilient key tab 340, and a vertically oriented opening 342, respectively. That is, the horizontally planar tab 338 of the second-half section 328 is adapted for securing engagement with the horizontally oriented slot 332 of the one-half section 326. In addition, the tapered resilient key tab 340 of the second-half section 328 is adapted for insertion through the vertically oriented slot 336 of the one-half section 326 and for securing engagement with the locking tab 334 of the one-half section 326. Furthermore, the locking tab 334 of the one-half section 326 is adapted for securing engagement with the vertically oriented opening 342 of the second-half section 328.

Simultaneously, a securing arrangement 330 of a second-half section 328, which includes a horizontally oriented slot 332, a locking tab 334, and a vertically oriented slot 336, is secured to the securing arrangement 330 of the one-half section 326, which includes a horizontally planar tab 338, a tapered resilient key tab 340, and a vertically oriented opening 342, respectively. That is, the horizontally planar tab 338 of the one-half section 326 is adapted for securing engagement with the horizontally oriented slot 332 of the second-half section 328. In addition, the tapered resilient key tab 340 of the one-half section 326 is adapted for insertion through the vertically oriented slot 336 of the second-half section 328 and for securing engagement with the locking tab 334 of the second-half section 328. Furthermore, the locking tab 334 of the second-half section 328 is adapted for securing engagement with the vertically oriented opening 342 of the one-half section 326.

The housing 302 can be cylindrical in shape, as shown in FIGS. 12, 13A, 13B, 14A and 14B. Alternatively, the housing 302 can have some other shape (not shown), such as conical, rectangular, triangular, pyramidal, or the like. The housing 302 can be constructed from a substance, such as wood, that is attractive, penetrable and/or digestible by termites. Alternatively, the housing 302 can be constructed from a thermoplastic injection molded polymeric material. If so desired, the particular thermoplastic injection molded polymeric material selected could be one in which the housing 302 would be transparent in appearance. In the specific embodiment illustrated in FIG. 13B, housing 302 has a unitary rather than a multi-piece configuration.

In the specific embodiment illustrated in FIG. 14B, inner retaining ridge 308 has increased surface areas, can be cone-shaped, and can include termite-attractive apertures 318.

An important feature of the present embodiment resides in the fact that the housing 302 is structured to provide a plurality of termite attractive channels 316 along the interior surface 304 and the exterior surface 306 of the housing 302. As shown in FIGS. 12, 13A, 13B, 14A and 14B, the channels 316 traverse along the interior surface 304 and the exterior surface 306 of the housing 302 substantially parallel to the central longitudinal axis 324 of the housing 302. Alternatively, the channels 316 can traverse along the interior surface 304 and the exterior surface 306 of the housing 302 in a substantially spiral or helical direction, with respect to the central longitudinal axis 324 of the housing 302. Alternatively, the channels 316 can be oriented in a substantially orthogonal or perpendicular fashion with respect to the central longitudinal axis 324 of the housing 302.

As shown in FIGS. 12, 13A, 13B, 14A and 14B, the channels 316 of the housing 302 have a substantially rectangular cross-sectional profile. However, the channels 316 of the housing 302 can be provided in any number of other cross-sectional profiles, such as substantially square, substantially triangular, substantially circular, substantially semi-circular, substantially oval, substantially semi-oval, substantially L-shaped, substantially T-shaped, or substantially X-shaped. The cross-sectional profiles of the channels 316 have a dimension (i.e., depth, width, diameter, or the like) that preferably ranges from about 3 millimeters (mm) to about 5 mm.

It is also important that each channel 316 provide an elongate volume in and through which termites would be wont to travel and construct mud tubes as part of their excursions to and from their foraging and nesting areas. As shown in FIGS. 12, 13A, 13B, 14A and 14B, channels 316 generally form a series of alternating troughs 344 and corresponding ridges 346 adjacent and parallel to the troughs 344. The troughs 344 can be formed integrally within the housing 302 therefore creating corresponding ridges 346, protruding out from housing 302, that are adjacent and parallel to the troughs 344. Alternatively, the ridges 346 can be provided as separate elongate pieces that are attached or secured to the housing 302 thus creating corresponding troughs 344 that are adjacent and parallel to the ridges 346.

Another important feature of the housing resides in the fact that the channels 316 along the interior surface 304 and the exterior surface 306 of the housing 302 have a plurality of termite attractive apertures 318 provided therein. The apertures 318 provide an avenue for termite ingress into and/or egress from the housing 302, at intermediate points along the exterior surface 306 and/or the interior surface 304, respectively, of the housing 302. Therefore, an aperture 318 is always available for a termite to travel through, regardless of whether the termite is traveling either from the outside to the inside, or from the inside to the outside, of the housing 302. As described hereinabove, apertures 318 can also be provided in inner retaining ridge 308, as shown in FIG. 14B, in order to attract and provided access for termites foraging below housing 302.

As shown in FIGS. 12, 13A, 13B, 14A and 14B, the apertures 318, within each channel 316, traverse along the interior surface 304 and the exterior surface 306 of the housing 302 substantially parallel to the central longitudinal axis 324 of the housing 302. Alternatively, the apertures 318, within each channel 316, can traverse along the interior surface 304 and the exterior surface 306 of the housing 302 in a substantially spiral or helical direction, with respect to the central longitudinal axis 324 of the housing 302. Alternatively, the apertures 318, within each channel 316, can be oriented in a substantially orthogonal or perpendicular fashion with respect to the central longitudinal axis 324 of the housing 302.

As shown in FIGS. 12, 13A, 13B, 14A and 14B, the apertures 318, within each channel 316 of the housing 302 and in inner retaining ridge 308, have a substantially circular cross-sectional profile. However, the apertures 318, within each channel 316 of the housing 302, can be present in any number of other cross-sectional profiles, such as substantially square, substantially rectangular, substantially triangular, substantially semi-circular, substantially oval, substantially semi-oval, substantially L-shaped, substantially T-shaped, or substantially X-shaped. The cross-sectional profiles of the apertures 318 have a dimension (i.e., depth, width, diameter, or the like) that preferably ranges from about 3 mm to about 5 mm.

Figure 15:
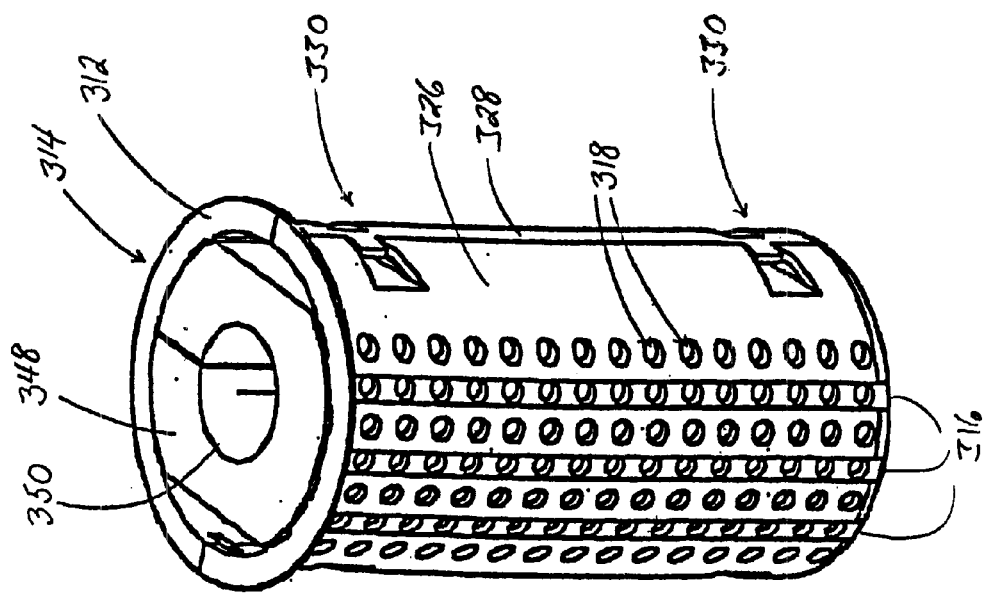
FIG. 15 is a perspective view of the housing illustrated in FIG. 13A and including the first material therein.

Referring to FIG. 15, a first termite attractive material (first material) 348, having a centrally dispose bore 350, is interposed within the elongate interior void 322 of the housing 302, adjacent to the spacers 320 of the housing 302, and in close proximity of the apertures 318 of the housing 302. The spacers 320 along the interior surface 304 of the housing 302 provide an amount of radial spacing between the first material 348 and the housing 302, while maintaining the position of the first material 348 substantially concentric with the central longitudinal axis 324 of the housing 302. Apertures 318 provide termites with an attractive passageway leading to the first material 348.

The first material 348 is suitable for facilitating the monitoring and/or controlling of termite activity disposed within the housing 302 by promoting or inviting termite exploration and/or feeding. The attractive attribute or property accorded to or presented by the first material 348 could be physical, comestible, or chemical in nature. The first material 348 is selected from the group consisting of a foam-type of material, a digestible material, and a termiticide, or a combination of two or more of these. The foam-type of material may include, but is not limited to, a floral foam. The digestible material may include, but is not limited to, a nourishing material, such as wood. The termiticide may include, but is not limited to, a slow-acting termiticide. The advantage of utilizing a slow-acting termiticide is that a termite that has come into contact with or digested an effective amount of a slow-acting termiticide will be able to return to the termite's nesting area and subsequently poison other termites within the termite colony. The first material 348 is preferably a combination of a floral foam and a slow-acting termiticide.

Most suitably, the first material 348 will be maintained in a wetted condition as a consequence of the damp, humid environment promoted by the shadowing effect of an associated lid 370 (see FIGS. 18A–18C), thereby further promoting or inviting termite exploration, burrowing, and/or feeding. During use, the first material 348 can be periodically rewetted as needed. In addition, the first material 348 is intended to be removably interposed within the elongate interior void 322 of the housing 302, adjacent to the spacers 320 of the housing 302, and in close proximity of the apertures 318 of the housing 302.

Referring now to FIG. 16, it can be appreciated that the housing 302 of the station 300 may optionally include a core 352 resting within the housing 302. The core 352 includes a jacket 354, a partially opened end 356, and an open end 358 opposing the partially opened end 356. The jacket 354 has a plurality of termite attractive slits 360. The core 352 further includes a partition divider 362 forming a number of inner partition chambers 364. The partition divider 362 defines the partially opened end 356. The core 352 further includes an outer cylindrical base 366, which defines the open end 358.

As shown in FIG. 16, the jacket 354 of the core 352 is positioned within centrally disposed bore 350 of the first material 348. The outer cylindrical base 366, which defines the open end 358 of the core 352, rests against and is supported by the inner retaining ridge 308 of the partially closed end 310 of the housing 302.

The core 352 can be cylindrical in shape, as shown in FIGS. 12 and 16. Alternatively, the core 352 can have some other shape (not shown), such as conical, rectangular, triangular, pyramidal, or the like. The core 352 can be constructed from a substance, such as wood, that is attractive, penetrable and/or digestible by termites. Alternatively, the core 352 can be constructed from a thermoplastic injection molded polymeric material. If so desired, the particular thermoplastic injection molded polymeric material selected could be one in which the core 352 would be transparent in appearance.

An important feature of the third embodiment of the invention resides in the fact that the jacket 354 of the core 352 is structured to provide a plurality of termite attractive slits 360. As shown in FIGS. 12 and 16, the slits 360 traverse along the jacket 354 of the core 352 substantially parallel to the central longitudinal axis 324 of the housing 302. Alternatively, the slits 360 can traverse along the jacket 354 of the core 352 in a substantially spiral or helical direction, with respect to the central longitudinal axis 324 of the housing 302. Alternatively, the slits 360 can be oriented in a substantially orthogonal or perpendicular fashion with respect to the central longitudinal axis 324 of the housing 302.

As shown in FIGS. 12 and 16, the slits 360 that traverse along the jacket 354 of the core 352 have a substantially rectangular cross-sectional profile. However, the slits 360 of the core 352 can be provided in any number of other cross-sectional profiles, such as substantially square, substantially triangular, substantially circular, substantially semi-circular, substantially oval, substantially semi-oval, substantially L-shaped, substantially T-shaped, or substantially X-shaped. The cross-sectional profiles of the slits 360 have a dimension (i.e., width, diameter, or the like) that preferably ranges from about 3 millimeters (mm) to about 5 mm.

It is also important that each slit 360 provide an elongate volume through which termites would be wont to travel and construct mud tubes as part of their excursions to and from their foraging and nesting areas. The slits 360 provide an avenue for termite ingress into and/or egress from the core 352. Therefore, a slit 360 is always available for a termite to travel through, regardless of whether the termite is traveling either from the outside to the inside, or from the inside to the outside, of the core 352.

Referring to FIG. 17, a second termite attractive material 368, is located within the core 352, adjacent to the slits 360 within the jacket 354. The slits 360 within the jacket 354 of the core 352 provide termites with an attractive passageway leading to the second material 368.

The second material 368 is suitable for facilitating the monitoring and/or controlling of termite activity disposed within the core 352 by promoting or inviting termite exploration and/or feeding. The attractive attribute or property accorded to or presented by the second material 368 could be physical, comestible, or chemical in nature. The second material 368 is selected from the group consisting of a foam-type of material, a digestible material, and a termiticide, or a combination of two or more of these. The foam-type of material may include, but is not limited to, a floral foam. The digestible material may include, but is not limited to, a nourishing material, such as wood. The termiticide may include, but is not limited to, a slow-acting termiticide. The advantage of utilizing a slow-acting termiticide is that a termite that has come into contact with or digested an effective amount of a slow-acting termiticide will be able to return to the termite's nesting area and subsequently poison other termites within the termite colony. The second material 368 is preferably wood in the shape of dowels. The wooden dowels are inserted through the partition divider 362, defining the partially opened end 356 of the core 352, and into the inner partition chambers 364. Partition divider 362 ensures that each dowel is spaced from adjacent dowels, thereby creating termite-attractive passageways between each dowel. The dowels also function to provide additional anchoring support for housing 302 to ensure that housing 302 remains fixed in its proper position at a ground location, and to make station 300 difficult to remove or access by a child or animal.

Preferably, the second material 368 will be maintained in a wetted condition as a consequence of the damp, humid environment promoted by the shadowing effect of lid 370 (see FIGS. 18A–18C), thereby further promoting or inviting termite exploration, burrowing, and/or feeding. During use, the second material 368 can be periodically rewetted as needed. In addition, the second material 368 is intended to be removably located within the core 352, adjacent to the slits 360 within the jacket 354.

Figure 18A:
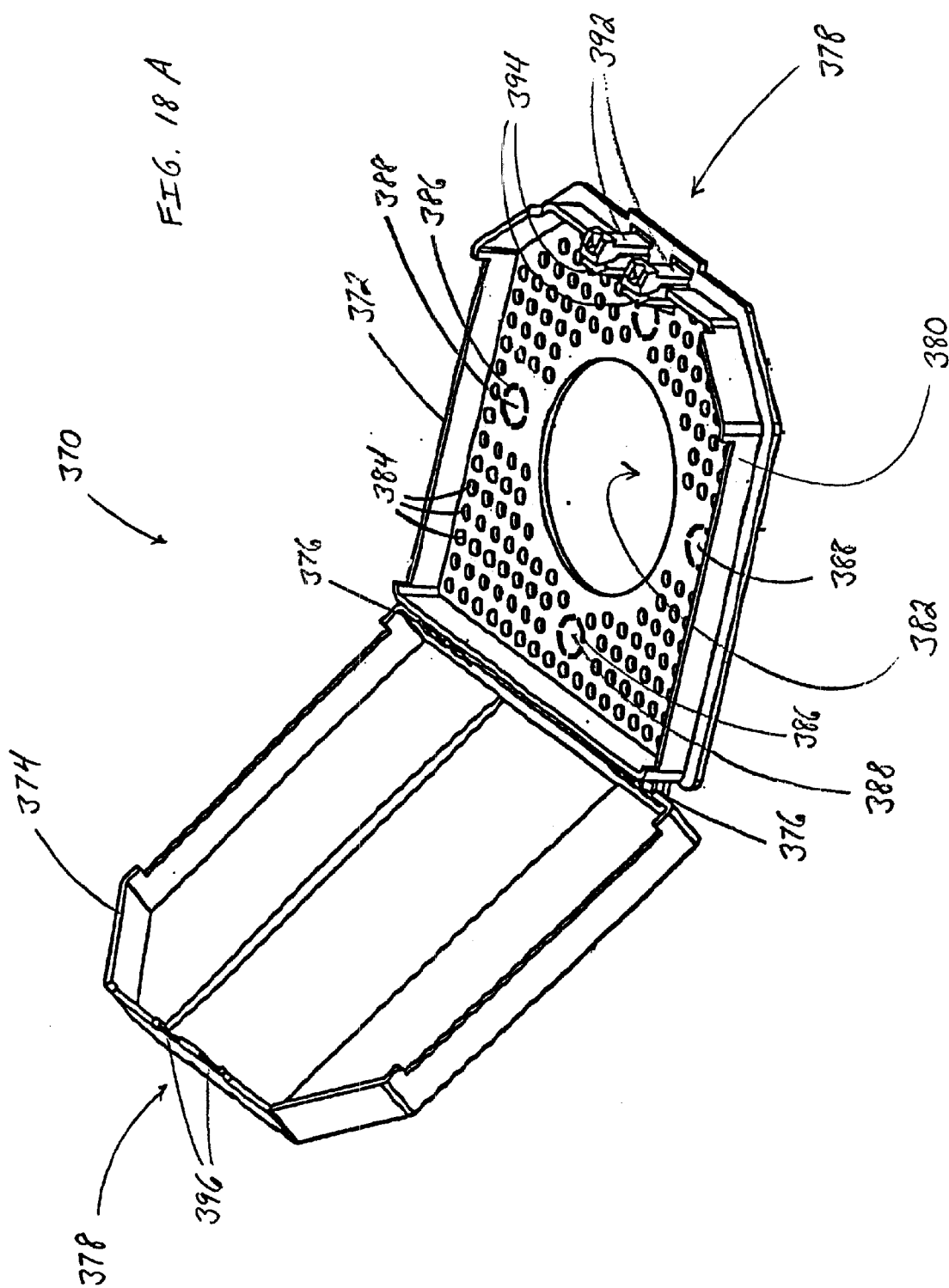
FIGS. 18A through 18C are perspective views of a lid for use in conjunction with the termite monitoring and/or controlling station illustrated in FIG. 12.
Figure 18:
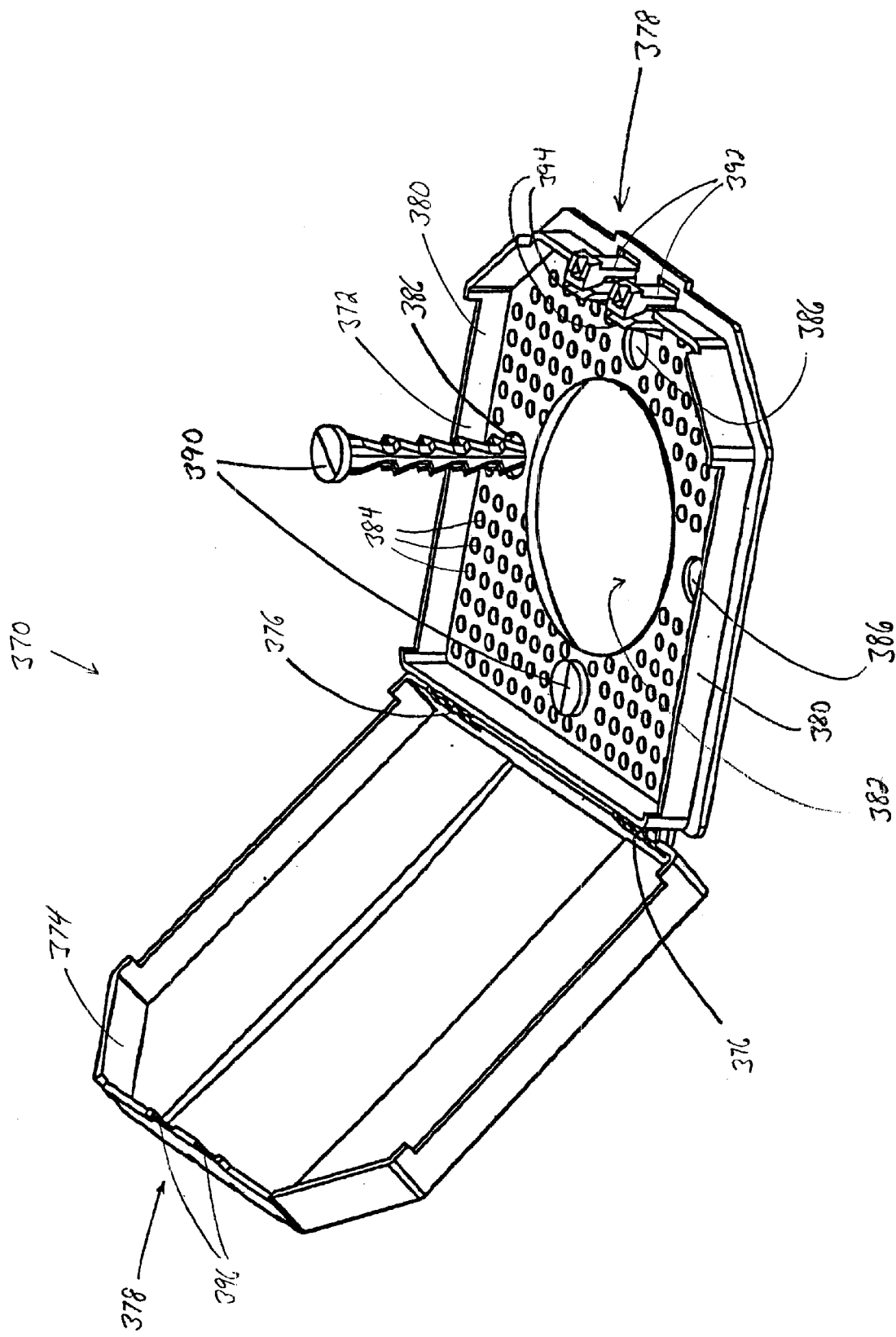
Figure 18C:
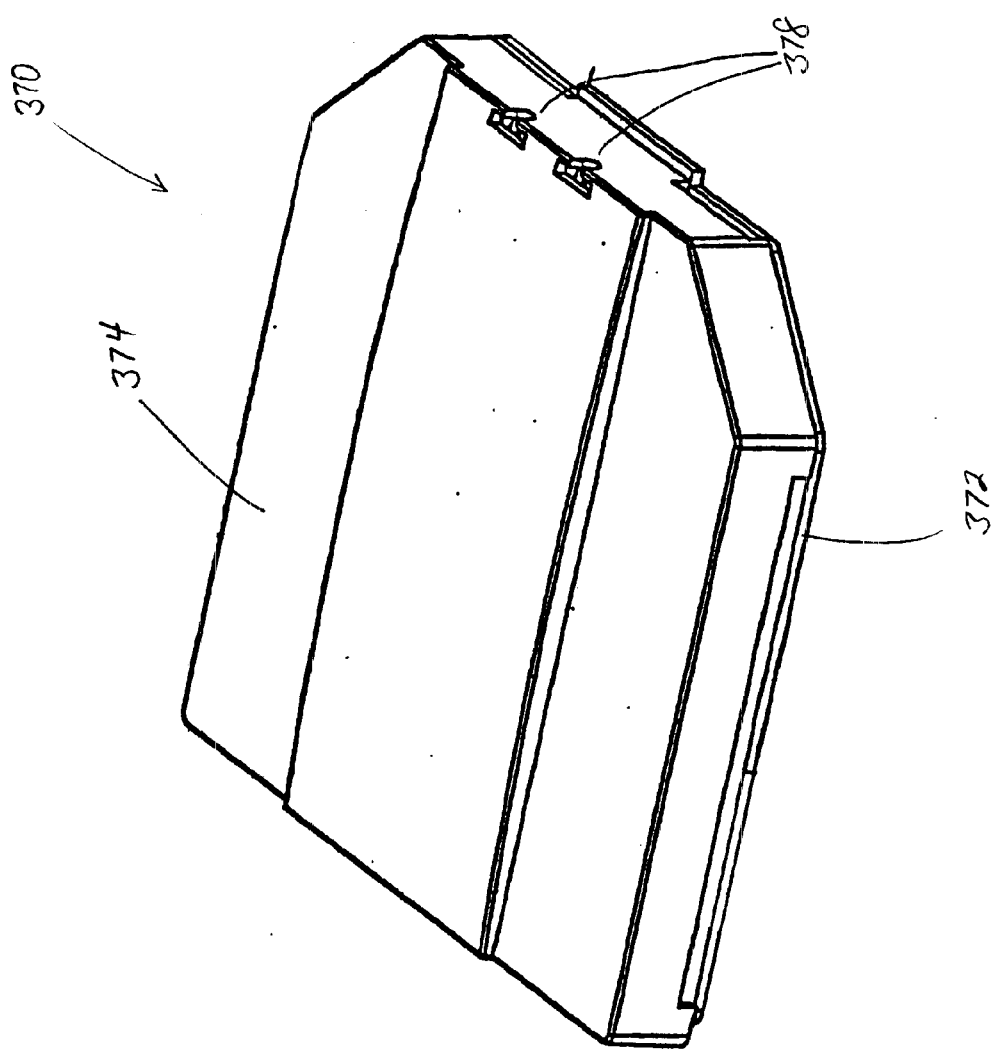

Referring now to FIGS. 12 and 18A through 18C, it can be seen that station 300 includes a lid 370. As shown in FIGS. 18A through 18C, the lid 370 includes a tray 372, a tray cover 374 hingedly coupled to the tray 372 by a hinge 376, and a locking mechanism 378. The tray 372 of the lid 370 includes a peripheral upwardly extending lip 380, a centrally disposed housing retaining hole 382, and a plurality of termite attractive orifices 384 surrounding the centrally disposed housing retaining hole 382. The tray 372 further includes a number of spike orifices 386 surrounding the centrally disposed housing retaining hole 382, and a number of removable spike tabs 388 covering the spike orifices 386. The tray may also include a number of anchoring spikes 390 that which are insertable into the spike orifices 386 once the removable spike tabs 388 are actually removed. The tray 372 also includes a cover locking tab 392 and a tapered resilient vertical tab 394 adjacent to the cover locking tab 392. The tray cover 374 of the lid 370 includes a locking tab receptacle 396.

The locking mechanism 378 includes the cover locking tab 392 and the tapered resilient vertical tab 394 of the tray 372, and the locking tab receptacle 396 of the tray cover 374. As shown in FIG. 18C, the locking mechanism 378 can be engaged by interlocking the cover locking tab 392 and the tapered resilient vertical tab 394 of the tray 372 with the locking tab receptacle 396 of the tray cover 374. As shown in FIG. 12, the locking mechanism 378 can be disengaged by unlocking the cover locking tab 392 and the tapered resilient vertical tab 394 of the tray 372 from the locking tab receptacle 396 of the tray cover 374 via the utilization of a key 398 that includes elongate members or prongs.

The lid 370 can be an irregular polygon, such as an irregular hexagon, as shown in FIGS. 12, 18A through 18C. Alternatively, the lid 370 can have some other shape (not shown), such as regular polygonal, square, triangular, circular, oval, or the like. The lid 370 can be constructed from a substance, such as wood, that is attractive, penetrable and/or digestible by termites. Alternatively, the lid 370 can be constructed from a thermoplastic injection molded polymeric material. If so desired, the particular thermoplastic injection molded polymeric material selected could be one in which the lid 370 would be transparent in appearance.

An important feature of the alternative embodiment resides in the fact that the tray 372 of the lid 370 is structured to provide a plurality of termite attractive orifices 384. As shown in FIGS. 18A through 18B, the orifices 384 surround the centrally disposed housing retaining hole 382.

As shown in FIGS. 18A through 18B, the orifices 384 within the tray 372 of the lid 370 have a substantially circular cross-sectional profile. However, the orifices 384 within the tray 372 of the lid 370 can be present in any number of other cross-sectional profiles, such as substantially square, substantially rectangular, substantially triangular, substantially semi-circular, substantially oval, substantially semi-oval, substantially L-shaped, substantially T-shaped, or substantially X-shaped. The cross-sectional profiles of the orifices 384 have a dimension (i.e., depth, width, diameter, or the like) that preferably ranges from about 3 mm to about 5 mm.

Another important feature of the third embodiment resides in the fact that the orifices 384 within the tray 372 of the lid 370 provide an avenue for termite ingress into and/or egress from the lid 370. Therefore, an orifice 384 is always available for a termite to travel through, regardless of whether the termite is traveling either from the outside to the inside, or from the inside to the outside, of the lid 370.

Referring to FIGS. 19A and 19B, a third termite attractive material 400 is disposed within the lid 370 adjacent to the orifices 384 within the tray 372. The orifices 384 within the tray 372 of the core 370 provide termites with an attractive passageway leading to the third material 400.

The third material 400 is suitable for facilitating the monitoring and/or controlling of termite activity occurring within the lid 370 by promoting or inviting termite exploration and/or feeding. The attractive attribute or property accorded to or presented by the third material 400 could be physical, comestible, or chemical in nature. The third material 400 is selected from the group consisting of a foam-type of material, a digestible material, and a termiticide, or a combination of two or more of these. The foam-type of material may include, but is not limited to, a floral foam. The digestible material may include, but is not limited to, a nourishing material, such as wood. The termiticide may include, but is not limited to, a slow-acting termiticide. The advantage of utilizing a slow-acting termiticide is that a termite that has come into contact with or digested an effective amount of a slow-acting termiticide will be able to return to the termite's nesting area and subsequently poison other termites within the termite colony.

Preferably, the third material 400 exists as a bilayer 402. The bilayer 402 of third material 400 includes a first layer 404 and a second layer 406. The first layer 404 is located directly adjacent to the orifices 384 of the tray 372. The second layer 406 is located directly adjacent to the tray cover 374. Therefore, the second layer 406 is interposed between the first layer 404 and the tray cover 374. As shown in FIG. 19A, the third material 400 of the first layer 404 is preferably wood, in the shape of wedges, which are located directly adjacent to the orifices 384 of the tray 372. The shape of the wedges are such that the wedges can be positioned into the tray 372 without obstructing the centrally disposed housing retaining hole 382 of the tray 372. The third material 400 of the second layer 406 is preferably a slow-acting termiticide in combination with an irregular hexagonal sheet of floral foam, having a centrally disposed hole 408 of a diameter equal to that of the centrally disposed housing retaining hole 382 of the tray 372.

Alternatively, as shown in FIG. 19B, third material 400 of first layer 404 is constructed from floral foam that includes a slow-acting termiticide, and is situated adjacent to orifices 384 of tray 372. First layer 404 in this embodiment has a hole 408 to accommodate housing 308. Second layer 406 is constructed from wood.

In addition, the third material 400 is preferably wetted to produce a damp and humid environment (or is maintained in a wetted condition as a result of the damp environment promoted by the previously described shadowing effect), which is intended to further promote or invite termite exploration, burrowing, and/or feeding. During use, the third material 400 can be periodically rewetted as needed.

Referring now to FIG. 20, the lid 370 of the station 300 includes a housing 302 whereby the outer rim 312 defining the open end 314 of the housing 302 is supported by the centrally disposed housing retaining hole 382 of the tray 372 of the lid 370.

The lid 370 has several functional features. First, the centrally disposed housing retaining hole 382 and the termite attractive orifices 384 of the lid 370 are useful for providing access to the open end 314 and the apertures 318 of the housing 302. Therefore, the lid 370 provides termites with an encouraging means of travel between the lid 370 and the housing 302.

Second, the lid 370 is also useful for shielding the third material 400 interposed within the lid 370, the first material 348 interposed within the housing 302, and optionally the second material 368 located within the core 352 from the heating and desiccating effects wrought by atmospheric conditions. The lid 370 essentially "shadows" the housing 302 and the areas immediately proximate thereto by creating a barrier to sunlight and acting as a condensation trap. Therefore, the soil, sand, clay, or detritus, or combinations thereof, which are situated beneath the lid 370 are kept cool and humid, according to psychrometric principles, thereby maintaining an optimal environment for attracting termites to the first attractive material 348 within the housing 302 and the third attractive material 400 within the lid 370. As a result, a cool, damp and humid environment is maintained within the lid 370, the housing 302, and the subterranean vicinity around the housing 302 located below the lid 370.

Third, the lid 370 is also useful in identifying the location of the housing 302 after the housing 302 has been installed into a particular ground location. During use, the platform 412 of the lid 370 is substantially flush with the ground surface at the area where housing 302 is to operate. In addition, the third material 400 is intended to be removably interposed within the lid 370, adjacent to the orifices 384 within the tray 372.

Figure 21:
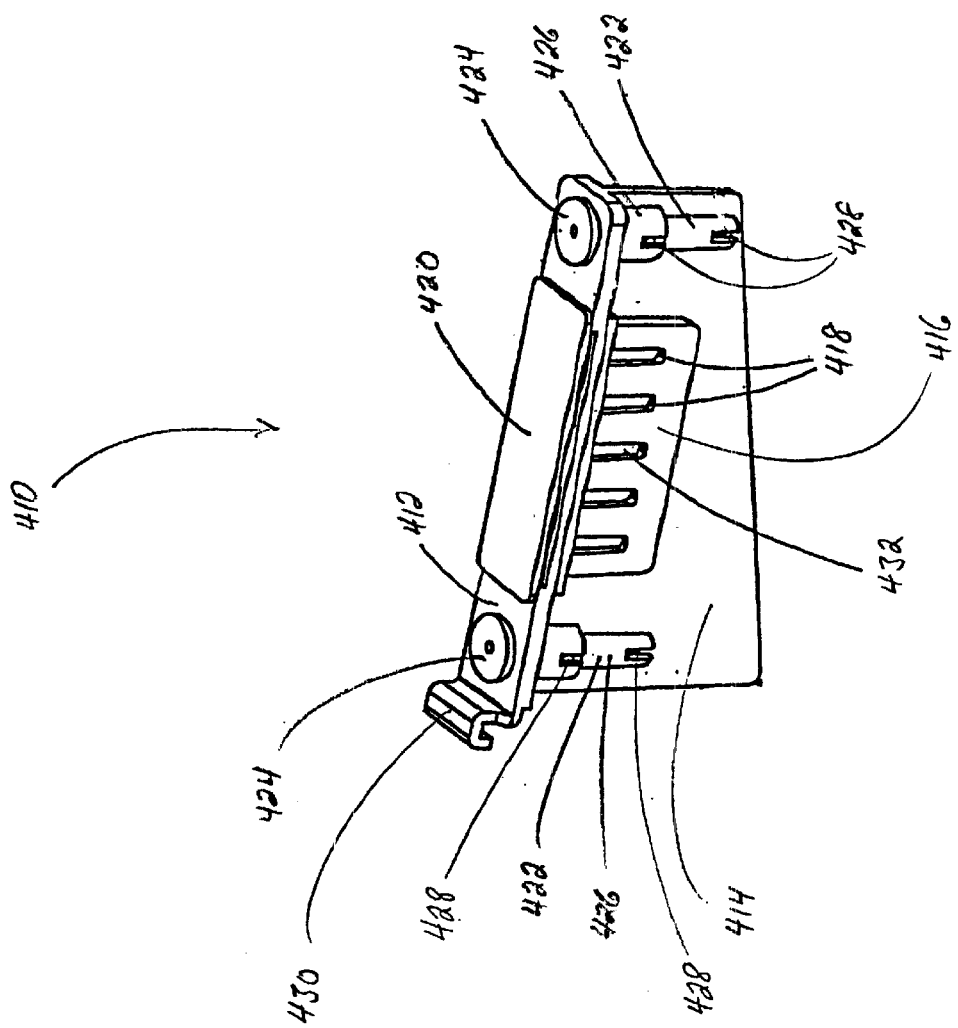
FIG. 21 is a perspective view of a deflector device for attachment to the lid.

Referring now to FIG. 21, the lid 370 of the station 300 may include a plurality of deflector members 410 removably attached to the lid 370. The deflector member 410 includes a platform 412, an elongate wedge 414 downwardly extending perpendicular to the platform 412, a wedge recess or slot 416 provided within the elongate wedge 414, and a plurality of termite attractive grooves 418 provided along the elongate wedge 414 adjacent to the wedge slot 416. The deflector member 410 may further include a detachable cap 420 that couples to the platform 412 directly above the wedge slot 416. Deflector member 410 can be composed of a polymeric material. One or more deflector members 410 are useful for increasing the total area of termite attraction toward station 300.

In addition, the deflector member 410 may also include a water dispenser 422. The water dispenser 422 includes a self-sealing water injection port 424, a water reservoir 426, and a number of water ducts 428. Water dispenser 422 can be composed of a polymeric material. The self-sealing water injection port 424 is a thermoplastic polymer selected from the group consisting of polysiloxane, polytetrafluoroethylene, polyester, nylon, polyolefin, and polyurethane, or a combination of two or more of these.

An important feature of the present embodiment resides in the fact that the elongate wedge 414 of the deflector member 410 is structured to provide a plurality of termite attractive grooves 418. As shown in FIG. 21, the grooves 418 traverse along the elongate wedge 414 adjacent to the wedge slot 416, substantially perpendicular to the platform 412 of the deflector member 410. Alternatively, the grooves 418 can traverse along the elongate wedge 414 adjacent to the wedge slot 416 at an angle other than a right angle relative to the platform 412 of the deflector member 410. Grooves 418 provide termites with access into slot 416.

As shown in FIG. 21, the grooves 418 that traverse along the elongate wedge 414 adjacent to the wedge slot 416 have a substantially rectangular cross-sectional profile. However, the grooves 418 of the deflector member 410 can be present in any number of other cross-sectional profiles, such as substantially square, substantially triangular, substantially circular, substantially semi-circular, substantially oval, substantially semi-oval, substantially L-shaped, substantially T-shaped, or substantially X-shaped. The cross-sectional profiles of the grooves 418 have a dimension (i.e., width, diameter, or the like) that ranges from about 3 mm to about 5 mm.

It is also important that each groove 418 provide an elongate volume through which termites would be wont to travel and construct mud tubes as part of their excursions to and from their foraging and nesting areas. The grooves 418 provide an avenue for termite ingress into and/or egress from the deflector member 410. Therefore, a groove 418 is always available for a termite to travel through, regardless of whether the termite is traveling either from the outside to the inside, or from the inside to the outside, of the deflector member 410.

The deflector member 410 may further include a lip attachment hook 430 for attaching the deflector member 410 to the peripheral upwardly extending lip 380 of the lid 370. Lip attachment hook 430 can be composed of a polymeric material.

Referring to FIG. 21, a fourth termite attractive material 432 (also shown in FIG. 12), is located within the wedge slot 416 of the deflector member 410, adjacent to the grooves 418 provided along the elongate wedge 414. The grooves 418 provided along the elongate wedge 414 of the deflector member 410 provide termites with an attractive passageway leading to the fourth material 432.

The fourth material 432 is suitable for facilitating the monitoring and/or controlling of termite activity disposed within the deflector member 410 by promoting or inviting termite exploration and/or feeding. The attractive attribute or property accorded to or presented by the fourth material 432 could be physical, comestible, or chemical in nature. The fourth material 432 is selected from the group consisting of a foam-type of material, a digestible material, and a termiticide, or a combination of two or more of these. The foam-type of material may include, but is not limited to, a floral foam. The digestible material may include, but is not limited to, a nourishing material, such as wood. The termiticide may include, but is not limited to, a slow-acting termiticide. The advantage of utilizing a slow-acting termiticide is that a termite that has come into contact with or has digested an effective amount of a slow-acting termiticide will be able to return to the termite's nesting area and subsequently poison other termites within the termite colony. The fourth material 432 is preferably wood in the shape of wedges. The wooden wedges are inserted into the wedge slot 416 within the elongate wedge 414, which has a plurality of termite attractive grooves 418 adjacent thereto.

Most suitably, the fourth material 432 is wetted to produce a damp and humid environment (or is maintained in a wetted condition as a result of use of water dispenser or dispensers 432), which is intended to further promote or invite termite exploration, burrowing, and/or feeding. During use, the fourth material 432 can be periodically rewetted as needed. In addition, the fourth material 432 is intended to be removably located within the wedge slot 416 of the deflector member 410 adjacent to the grooves 418 provided along the elongate wedge 414.

The deflector member 410 has several functional features. First, the elongate wedge 414 of the deflector member 410 provides additional anchoring support of the lid 370. Second, the deflector member 410 intercepts the natural paths of termites foraging in the vicinity of the housing 302 and redirects or at least encourages the termites to travel toward the housing 302. Third, the deflector member 410 is also useful for increasing the area of termite attraction by providing a fourth material 432 and maintaining the dampness or moisture content of the area surrounding the deflector member 410 as well as the housing 302 via a water dispenser 422.

Figure 22:
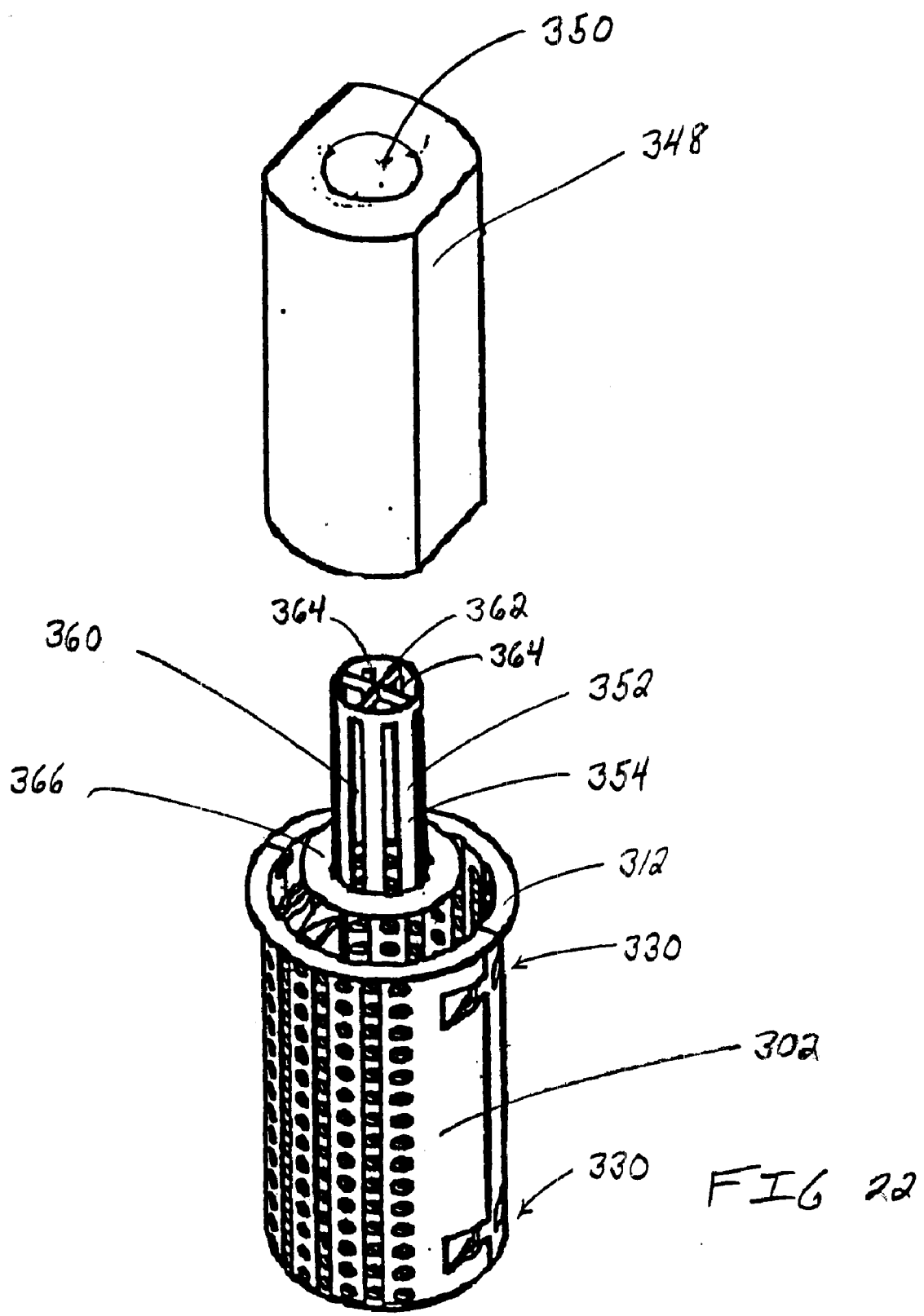
FIG. 22 is an exploded view of the housing, a core, and a first material provided in accordance with the present invention.
Figure 36:
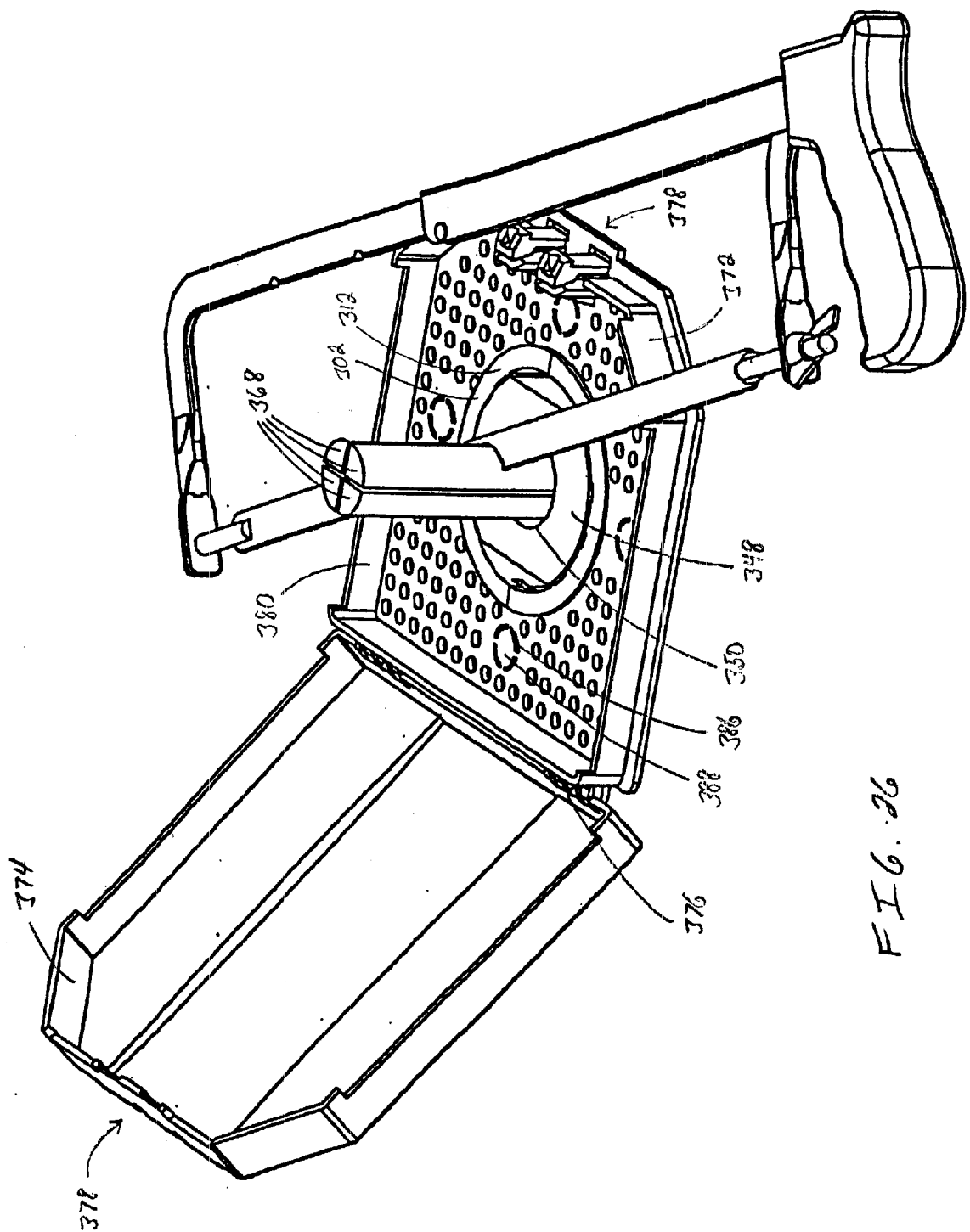
Figure 27:
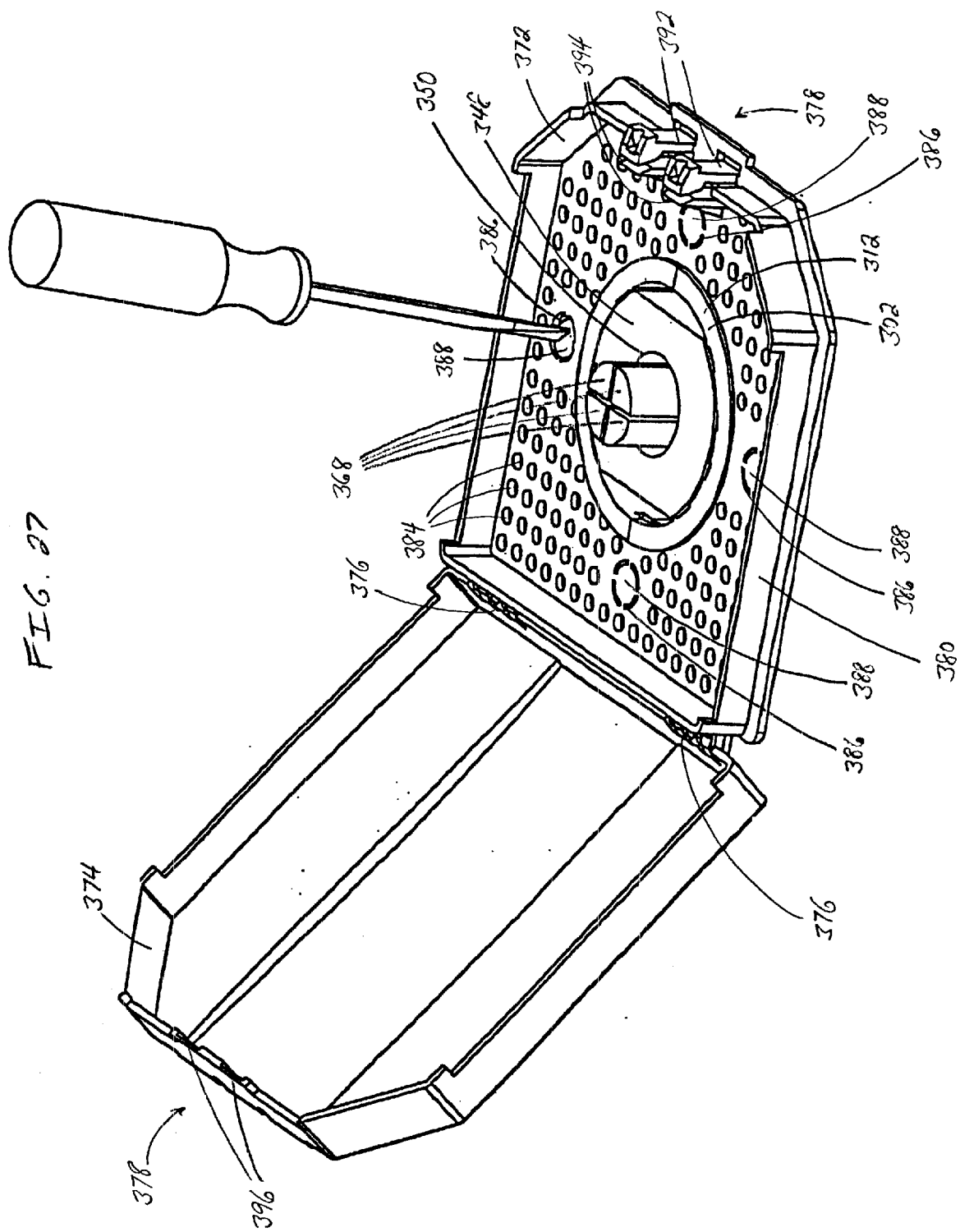
FIG. 27 is a perspective view of the removal of spike tabs from a tray of the lid.
Figure 72:
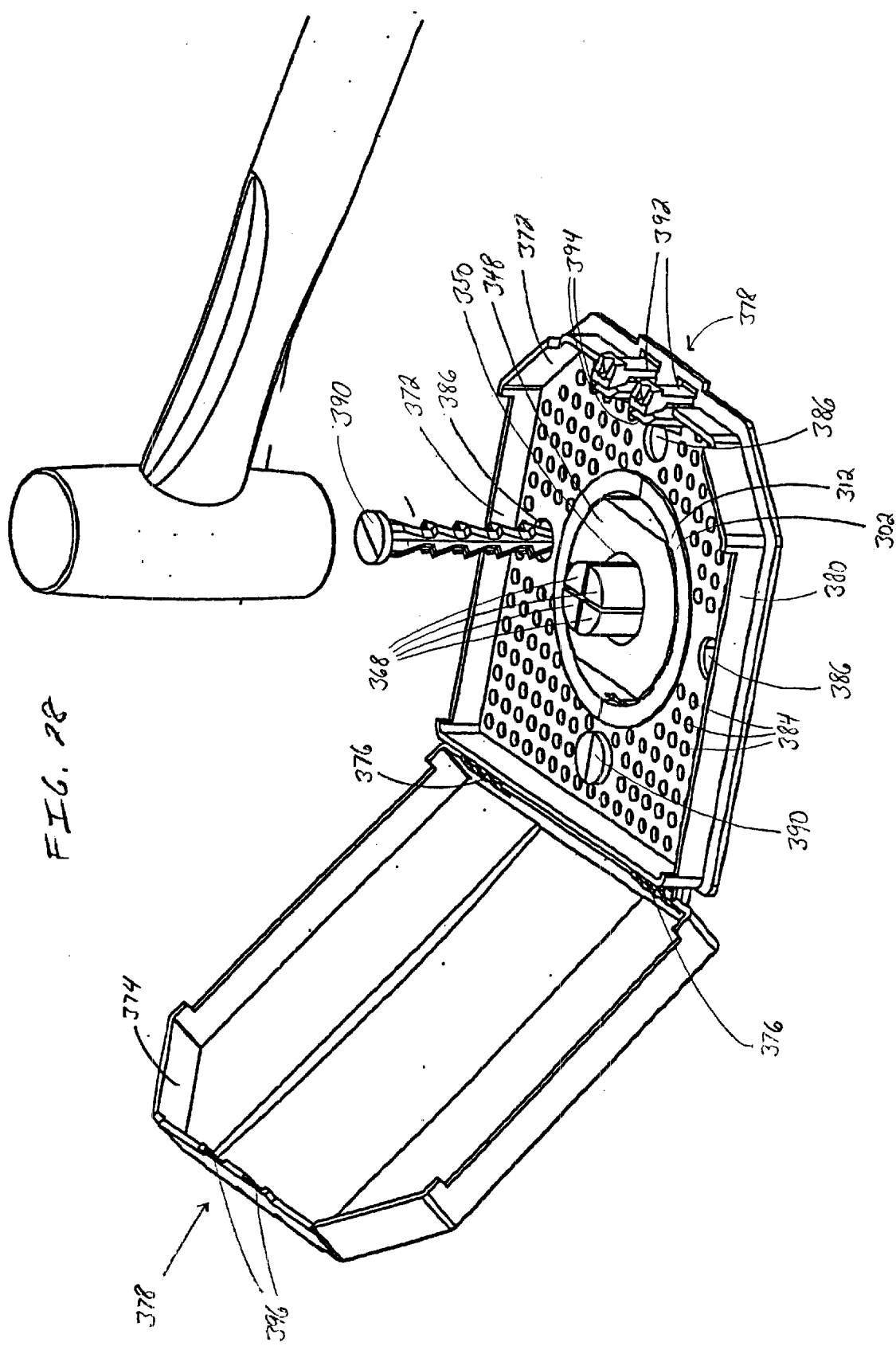
Figure 29:
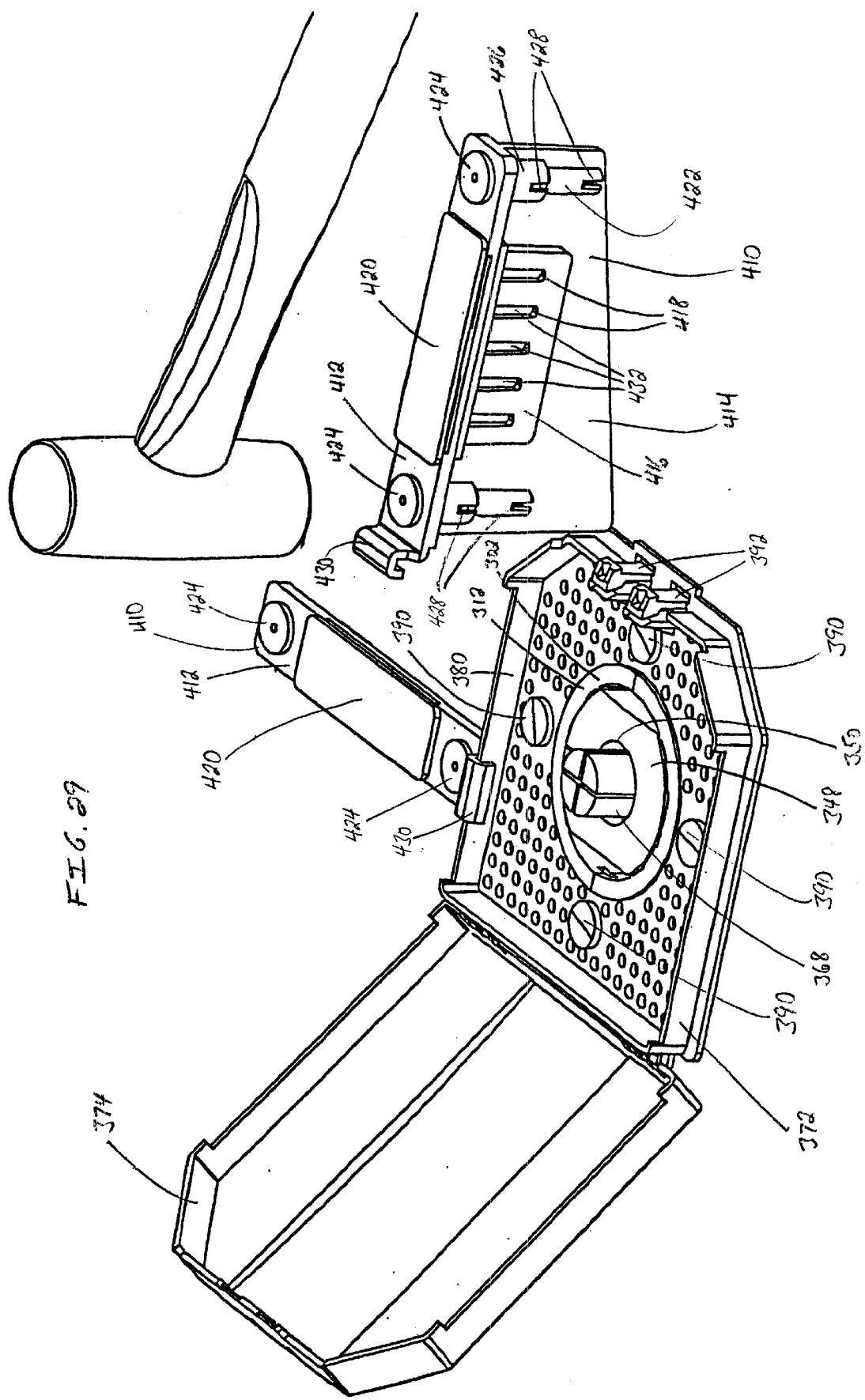
FIG. 29 is a perspective view illustrating the attachment of the deflector members to the lid.

Referring now to FIGS. 22 through 31 to describe in detail the assembly of station 300, the station 300 is assembled by first inserting the core 352 into the housing 302 and then inserting the first material 348 interposed between the core 353 and the housing 302 (see FIG. 22). Alternatively, core 352 is first inserted into axial bore 350 of first material 348 prior to insertion of first material 348 into housing 302. Once a particular ground location is chosen, a hole is then bored into the ground, such as soil, sand, clay, or detritus, or combinations thereof. The diameter of the hole in the ground must be substantially the same as the diameter associated with the centrally disposed housing retaining hole 382 of the lid 370 which is positioned substantially flush with the ground location (see FIG. 23). The partially closed end 310 of the housing 302 is passed through the centrally disposed housing retaining hole 382 of the lid 370 and inserted into the ground (see FIG. 24). The outer rim 312 of the open end 314 of the housing 302 is supported by the centrally disposed housing retaining hole 382 of the lid 370. The second material 368 is then inserted into the core 352 (see FIG. 25) and any excess second material 368 is removed (see FIG. 26). The removable spike tabs 388 are removed from the tray 372 (see FIG. 27), leaving behind spike orifices 386 into and through which anchoring spikes 390 are inserted to provide the lid 370 with anchoring support (see FIG. 28). A deflector member 410 is then attached via the lip engagement hook 430, to the peripheral upwardly extending lip 380 of the lid 370 (see FIG. 29). The third material 400 is inserted into the lid 370 and the fourth material 432 is inserted into the wedge slot 416 of the deflector member 410 (see FIG. 30). Finally the tray 372 and the tray cover 374 are secured together via the locking mechanism 378 (see FIG. 31). Apparatus 300 is now ready to monitor and/or control termites as described herein.

It will be understood that various details of the invention may be changed without departing from the scope of the invention. Furthermore, the foregoing description is for the purpose of illustration only, and not for the purpose of limitation-the invention being defined by the claims.

What is claimed is:

1. A termite monitoring and/or controlling apparatus comprising:
    (a) a housing adapted for subterranean installation at a ground location and including a wall disposed along a longitudinal axis of the housing, the wall including a termite attractive channel, the channel having a plurality of termite attractive apertures;
    (b) a first termite attractive material disposed within the housing adjacent to the apertures and having an axial bore generally parallel with the longitudinal axis; and
    (c) a second termite attractive material disposed within the axial bore.

2. The apparatus according to claim 1 wherein the second termite attractive material is partitioned into a plurality of second termite attractive material subcomponents, each subcomponent extending generally in parallel with the longitudinal axis and spaced from the other subcomponents.

3. The apparatus according to claim 2 comprising a core disposed within the axial bore of the first termite attractive material, the core including a partitioning structure defining a plurality of axially oriented core subsections, wherein each second termite attractive material subcomponent is retained by the partitioning structure in a corresponding one of the core subsections.

4. The apparatus according to claim 1 wherein the first termite attractive material includes a material selected from the group consisting of foam, wood, and termiticide, or a combination of two or more of these.

5. The apparatus according to claim 4 wherein the first termite attractive material consists essentially of a floral foam and a slow-acting termiticide.

6. The apparatus according to claim 1 wherein the second termite attractive material includes a material selected from the group consisting of foam, wood, and termiticide, or a combination of two or more of these.

7. The apparatus according to claim 6 wherein the second termite attractive material consists essentially of wood.

8. The apparatus according to claim 1 comprising:
    (a) a lid adapted for being positioned substantially flush with the ground location, the lid including a tray and a tray cover hingedly coupled to the tray, the tray having a housing retaining aperture and a plurality of termite attractive orifices, wherein the housing extends through the housing retaining aperture; and
    (b) a third termite attractive material disposed on the tray adjacent to the termite attractive orifices thereof.

9. The apparatus according to claim 8 wherein the lid includes a locking mechanism for removably securing the tray cover to the tray.

10. The apparatus according to claim 9 wherein the locking mechanism includes a cover locking tab, a tapered resilient vertical tab adjacent to the cover locking tab, and a locking tab receptacle adapted for engagement with the cover locking tab.

11. The apparatus according to claim 10 comprising a key adapted for engagement with the locking mechanism to release the locking mechanism.

12. The apparatus according to claim 8 wherein the tray includes a spike orifice covered by a removable spike tab, and an anchoring spike insertable into the spike orifice after the spike tab is removed.

13. The apparatus according to claim 8 wherein the third termite attractive material includes a material selected from the group consisting of foam, wood, and termiticide, or a combination of two or more of these.

14. The apparatus according to claim 13 wherein the third termite attractive material consists essentially of a floral foam, wood, and a slow-acting termiticide.

15. The apparatus according to claim 1 comprising a deflector member extending generally radially with respect to the housing, the deflector member including a wedge adapted for at least partial subterranean installation at the ground location.

16. The apparatus according to claim 15 comprising a tray extending transversely with respect to the housing, wherein the deflector member is removably attached to the tray.

17. The apparatus according to claim 16 wherein the deflector member includes a hook removably engaging the tray.

18. The apparatus according to claim 15 wherein the wedge has a recess extending downwardly into the wedge and a termite attractive groove formed in the wedge to provide access to the recess, the deflector member includes a cap removably covering an opening of the recess, and the apparatus further comprises a fourth termite attractive material disposed in the recess.

19. The apparatus according to claim 18 wherein the deflector member includes a water dispenser, the water dispenser including water injection port, a water reservoir, and a water duct.

20. The apparatus according to claim 19 wherein the water injection port is formed form a thermoplastic polymer selected from the group consisting of polysiloxane, polytetrafluoro-ethylene, polyester, nylon, polyolefin, and polyurethane, or a combination of two or more of these.

21. The apparatus according to claim 18 wherein the fourth termite attractive material includes a material selected from the group consisting of foam, wood, and termiticide, or a combination of two or more of these.

22. The apparatus according to claim 21 wherein the fourth termite attractive material consists essentially of wood.

23. A termite monitoring and/or controlling apparatus comprising:
(a) a housing having a plurality of termite attractive channels, a partially closed end, and an open end opposing the partially closed end, the channels having a plurality of termite attractive apertures, the housing adapted for subterranean installation at a ground location;
(b) a first termite attractive material having a centrally disposed bore, the first attractive material disposed within the housing adjacent to the apertures;
(c) a lid having a housing retaining hole and a plurality of termite attractive orifices, the lid adapted for being positioned substantially flush with the ground location, wherein the open end of the housing is supported by the housing retaining hole;
(d) a second termite attractive material disposed within the lid adjacent to the orifices;
(e) at least one deflector member having a platform, an elongate wedge downwardly extending perpendicular to the platform, a wedge slot provided within the elongate wedge, and a plurality of termite attractive grooves provided along the elongate wedge adjacent to the wedge slot, the platform being removably attached to the lid and adapted for being positioned substantially flush with the ground location; and
(f) a third termite attractive material located within the wedge slot of the deflector member adjacent to the grooves.

24. A termite monitoring and/or controlling apparatus comprising:
(a) a housing having a plurality of termite attractive channels, a partially closed end, and an open end opposing the partially closed end, the channels having a plurality of termite attractive apertures, the housing adapted for subterranean installation at a ground location;
(b) a first termite attractive material having a centrally disposed bore, the first attractive material disposed within the housing adjacent to the apertures;
(c) a core having a jacket, a partially opened end, and an open end, the jacket having a plurality of termite attractive slits, the jacket positioned within the centrally disposed bore of the first attractive material, the open end of the core resting against the partially closed end of the housing within the housing;
(d) a second termite attractive material located within the core and adjacent to the slits;
(e) a lid having a housing retaining hole therein and a plurality of termite attractive orifices, wherein the open end of the housing is supported by the housing retaining hole, and the lid is adapted for being positioned substantially flush with the ground location;
(f) a third termite attractive material disposed within the lid adjacent to the orifices;
(g) at least one deflector member having a platform, an elongate wedge downwardly extending from the platform, a wedge slot provided within the elongate wedge, and a plurality of termite attractive grooves provided along the elongate wedge adjacent to the wedge slot, the platform being removably attached to the lid and adapted for being positioned substantially flush with the ground location; and
(h) a fourth termite attractive material located within the wedge slot of the deflector member adjacent the grooves.

25. A termite monitoring and/or controlling apparatus comprising:
(a) a housing adapted for subterranean installation at a ground location and including a wall disposed along a longitudinal axis of the housing, the wall including a termite attractive channel, the channel including a plurality of termite attractive apertures;
(b) a first termite attractive material disposed within the housing adjacent to the apertures and including an axial bore generally parallel with the longitudinal axis;
(c) a second termite attractive material disposed within the axial bore;
(d) a tray extending transversely with respect the housing; and
(e) a third termite attractive material disposed adjacent to a surface of the tray.

26. The apparatus according to claim 25 comprising a wedge including a top edge removably connected to the tray and a body depending downwardly from the top edge.

27. The apparatus according to claim 26 wherein the wedge has an interior region and a slot communicating with the interior region, and wherein a fourth termite attractive material is disposed within the interior region.

28. A termite monitoring and/or controlling apparatus comprising:
(a) a housing adapted for subterranean installation at a ground location and including a wall disposed along a longitudinal axis of the housing, the wall including a termite attractive channel, the channel including a plurality of termite attractive apertures;

(b) a first termite attractive material disposed within the housing adjacent to the apertures and including an axial bore generally parallel with the longitudinal axis;

(c) a second termite attractive material disposed within the axial bore;

(d) an enclosure extending generally transversely with respect the housing, the enclosure including a tray, a tray cover, and a locking mechanism removably securing the tray cover to the tray; and (e) a third termite attractive material disposed within the enclosure.

29. The apparatus according to claim 28 wherein the locking mechanism includes a cover locking tab formed in the tray, a tapered resilient vertical tab formed in the tray and disposed adjacent to the cover locking tab, and a locking tab receptacle formed in the tray cover and adapted for engagement with the cover locking tab.

30. The apparatus according to claim 29 comprising a key device adapted for insertion into the locking tab receptacle and for engagement with the cover locking tab.

* * * * *